US012734376B2

(12) United States Patent
Turiello

(10) Patent No.: US 12,734,376 B2
(45) **Date of Patent: *Sep. 15, 2026**

(54) METHOD, DEVICE AND SYSTEM OF ACCESS CONTROL AND MANAGEMENT OF COMPONENTS OF A FIREFIGHTER AIR REPLENISHMENT SYSTEM HAVING BREATHABLE AIR SUPPLIED THEREACROSS

(71) Applicant: RESCUE AIR SYSTEMS, INC., San Carlos, CA (US)

(72) Inventor: Anthony J. Turiello, Westlake, TX (US)

(73) Assignee: Rescue Air Systems, Inc., San Carlos, CA (US)

( * ) Notice: Subject to any disclaimer, the term of this patent is extended or adjusted under 35 U.S.C. 154(b) by 680 days.

This patent is subject to a terminal disclaimer.

(21) Appl. No.: 18/197,118

(22) Filed: May 15, 2023

(65) Prior Publication Data

US 2024/0001161 A1 Jan. 4, 2024

Related U.S. Application Data

(60) Provisional application No. 63/359,882, filed on Jul. 11, 2022, provisional application No. 63/357,145, (Continued)

(51) Int. Cl.
*A62B 7/02* (2006.01)

(52) U.S. Cl.
CPC .................................... *A62B 7/02* (2013.01)

(58) Field of Classification Search
None
See application file for complete search history.

(56) References Cited

U.S. PATENT DOCUMENTS

| | | | |
|---|---|---|---|
| 1,040,311 | A | 10/1912 | Halloran |
| 1,643,155 | A | 9/1927 | Eisenschitz |

(Continued)

FOREIGN PATENT DOCUMENTS

| | | | |
|---|---|---|---|
| AR | 070623 | A1 | 4/2010 |
| AU | 2019101454 | A4 | 1/2020 |

(Continued)

OTHER PUBLICATIONS

Bhatnagar et al., "Machine Learning Techniques to Reduce Error in the Internet of Things," IEEE, 9th International Conference on Cloud Computing, Data Science & Engineering—Confluence—(pp. 403-408).

(Continued)

*Primary Examiner* — Davetta W Goins
(74) *Attorney, Agent, or Firm* — Foley & Lardner LLP

(57) ABSTRACT

Disclosed are a method, a device and a system of access control and management of one or more component(s) of a safety system related to access of breathable air supplied across the safety system. Based on execution of a computing platform on a data processing device, the computing platform is integrated with one or more sensor(s) associated with the one or more component(s). In accordance with the integration of the computing platform with the one or more sensor(s), the data processing device controls access of the one or more component(s), and captures, in conjunction with the one or more sensor(s), one or more parameter(s) of the access of the one or more component(s) based on the control of the access.

20 Claims, 10 Drawing Sheets

Related U.S. Application Data filed on Jun. 30, 2022, provisional application No. 63/356,996, filed on Jun. 29, 2022.

(56) References Cited

U.S. PATENT DOCUMENTS 2,341,113 A 2/1944 Nelson
3,429,186 A 2/1969 Price
3,477,688 A 11/1969 Cruse
3,625,065 A 12/1971 Thompson
3,925,763 A 12/1975 Wadhwani et al.
4,014,216 A 3/1977 Thornton
4,023,146 A 5/1977 Carroll
4,091,874 A 5/1978 Monma
4,134,457 A 1/1979 Raymond
4,165,738 A 8/1979 Dyer
4,336,590 A 6/1982 Jaco et al.
4,373,522 A 2/1983 Zien
4,375,637 A 3/1983 Desjardins
4,380,187 A 4/1983 Wicks
4,413,622 A 11/1983 Austin
4,467,796 A 8/1984 Beagley
4,570,719 A 2/1986 Wilk
4,856,565 A 8/1989 Schoeffl et al.
4,862,931 A 9/1989 Vella
4,905,684 A 3/1990 Heffer
5,095,899 A 3/1992 Green
5,163,422 A 11/1992 Burgess
5,396,885 A 3/1995 Nelson
5,497,855 A 3/1996 Moore
5,507,283 A 4/1996 Grivas
5,538,690 A 7/1996 Greer et al.
5,564,626 A 10/1996 Kettler et al.
5,570,685 A 11/1996 Turiello
5,619,333 A 4/1997 Staff et al.
5,707,005 A 1/1998 Kettler et al.
5,720,659 A 2/1998 Wicks
5,730,121 A 3/1998 Hawkins et al.
5,746,976 A 5/1998 Yamada et al.
5,800,260 A 9/1998 Kao
5,901,758 A 5/1999 Hwang et al.
5,979,440 A 11/1999 Honkonen et al.
5,992,532 A 11/1999 Ramsey et al.
6,112,807 A 9/2000 Dage
6,310,552 B1 10/2001 Stumberg et al.
6,357,532 B1 3/2002 Laskaris et al.
6,369,716 B1 4/2002 Abbas et al.
6,401,487 B1 6/2002 Kotliar
6,418,752 B2 7/2002 Kotliar
6,488,026 B2 12/2002 Lauer
6,502,421 B2 1/2003 Kotliar
6,543,444 B1 4/2003 Lewis
6,585,583 B1 7/2003 Chan
6,647,301 B1 11/2003 Sederlund et al.
6,712,071 B1 3/2004 Parker
6,810,910 B2 11/2004 McHugh
6,832,952 B2 12/2004 Faltesek et al.
6,866,102 B2 3/2005 Boyce et al.
6,873,256 B2 3/2005 Pedersen et al.
6,920,874 B1 7/2005 Siegel
6,940,403 B2 9/2005 Kail et al.
6,999,562 B2 2/2006 Winick
7,091,852 B2 8/2006 Mason et al.
7,100,689 B2 9/2006 Williams et al.
7,124,833 B2 10/2006 Sant'Angelo
7,161,481 B2 1/2007 Turner
7,168,428 B1 1/2007 Zoha
7,183,115 B1 2/2007 Lauglin
7,186,084 B2 3/2007 Bunker et al.
7,204,249 B1 4/2007 Richey et al.
7,221,260 B2 5/2007 Berezowski et al.
7,250,000 B2 7/2007 Daniels, II
7,255,104 B2 8/2007 Phillips
7,302,313 B2 11/2007 Sharp et al.
7,347,204 B1 3/2008 Lindsey et al.
7,377,835 B2 5/2008 Parkulo et al.
7,395,704 B2 7/2008 DiFoggio
7,468,082 B2 12/2008 Gordon
7,509,968 B2 3/2009 Surawski
7,527,056 B2 5/2009 Turiello
7,548,833 B2 6/2009 Ahmed
7,568,375 B2 8/2009 Sasaki et al.
7,598,856 B1 10/2009 Nick et al.
7,621,269 B2 11/2009 Turiello
7,654,279 B2 2/2010 Horton et al.
7,658,190 B1 2/2010 Phifer et al.
7,673,629 B2 3/2010 Turiello
7,677,247 B2 3/2010 Turiello
7,694,678 B2 4/2010 Turiello
7,710,282 B1 5/2010 Young
7,765,072 B2 7/2010 Eiler et al.
7,770,610 B2 8/2010 Lisle
7,804,402 B2 9/2010 Lang et al.
7,817,050 B2 10/2010 Goodman et al.
7,823,609 B2 11/2010 Wonders
7,857,068 B2 12/2010 Wagner
7,868,752 B1 1/2011 Herbold
7,880,607 B2 2/2011 Olson et al.
7,921,869 B2 4/2011 Surawski
7,934,411 B2 5/2011 Koch
7,953,228 B2 5/2011 Faltesek et al.
7,975,729 B2 7/2011 Lisle
8,038,948 B1 10/2011 Laughlin
8,074,278 B2 12/2011 Law et al.
8,077,026 B2 12/2011 Jobe et al.
8,114,954 B2 2/2012 DeBruin
8,116,913 B2 2/2012 Mirpourian et al.
8,147,302 B2 4/2012 Desrochers et al.
8,149,109 B2 4/2012 Lontka
8,196,479 B2 6/2012 Ludwick et al.
8,219,249 B2 7/2012 Harrod et al.
8,291,941 B1 10/2012 Berardi
8,371,295 B2 2/2013 Turiello
8,375,876 B2 2/2013 Van Tassel
8,375,948 B2 2/2013 Turiello
8,381,726 B2 2/2013 Turiello
8,413,653 B2 4/2013 Turiello
8,443,800 B2 5/2013 Turiello
8,517,696 B2 8/2013 McLoughlin et al.
8,538,687 B2 9/2013 Plocher et al.
8,573,317 B2 11/2013 Krüger et al.
8,602,119 B2 12/2013 Wagner
8,611,323 B2 12/2013 Berger et al.
8,668,023 B2 3/2014 Wilkins et al.
8,701,718 B1 4/2014 Turiello
8,733,355 B2 5/2014 Turiello
8,745,792 B2 6/2014 McGlynn
8,755,839 B2 6/2014 Parkulo et al.
8,770,190 B2 7/2014 Doherty et al.
8,773,946 B2 7/2014 Padmanabhan et al.
8,795,041 B2 8/2014 Saito et al.
8,797,141 B2 8/2014 Best et al.
8,797,210 B2 8/2014 Derrick et al.
8,866,618 B2 10/2014 Cotten et al.
8,995,946 B2 3/2015 Miller
9,010,019 B2 4/2015 Mittelmark
9,032,994 B2 5/2015 McHugh et al.
9,033,061 B2 5/2015 Chattaway et al.
9,080,683 B2 7/2015 Carter et al.
9,105,171 B2 8/2015 Flood et al.
9,109,981 B2 8/2015 Sharp
9,134,284 B1 9/2015 Laughlin
9,175,975 B2 11/2015 Shtukater
9,220,937 B2 12/2015 Wagner
9,234,661 B2 1/2016 Young et al.
9,235,975 B2 1/2016 Gettings et al.
9,242,126 B2 1/2016 Turiello
9,243,753 B2 1/2016 Wonders
9,328,936 B2 5/2016 Meirav et al.
9,347,677 B2 5/2016 Eberlein et al.
9,404,666 B2 8/2016 Terlson et al.
9,466,199 B2 10/2016 McNabb et al.
9,468,157 B2 10/2016 Hu
9,564,028 B2 2/2017 Cerrano
9,566,608 B2 2/2017 Tran

(56) References Cited

U.S. PATENT DOCUMENTS 9,670,670 B2 6/2017 Teron
9,671,794 B1 6/2017 Lymberopoulos et al.
9,682,257 B2 6/2017 Zhao et al.
9,702,802 B2 7/2017 Ajay et al.
9,724,484 B2 8/2017 Robey
9,733,149 B2 8/2017 Eberlein
9,829,895 B2 11/2017 McLoughlin et al.
9,852,604 B2 12/2017 Poder
9,875,631 B2 1/2018 Mittleman et al.
9,927,066 B1 3/2018 Wonders
9,933,115 B2 4/2018 Rado et al.
9,964,470 B2 5/2018 Sharp
10,042,164 B2 8/2018 Kuutti et al.
10,044,857 B2 8/2018 Philbin
10,052,509 B2 8/2018 Wagner
10,062,233 B1 8/2018 Rogers et al.
10,074,295 B2 9/2018 Hyman
10,078,865 B2 9/2018 Joshi et al.
10,078,959 B2 9/2018 Rossi et al.
10,121,361 B2 11/2018 Deluliis et al.
10,124,196 B2 11/2018 Roberts
10,139,282 B2 11/2018 Chrostowski
10,156,320 B2 12/2018 Toelle
10,161,923 B1 12/2018 Laughlin
10,192,411 B2 1/2019 Wedig et al.
10,311,444 B1 6/2019 Conboy
10,380,862 B1 8/2019 Heidary
10,380,863 B2 8/2019 Wedig et al.
10,400,442 B2 9/2019 Power et al.
10,417,451 B2 9/2019 Park et al.
10,426,064 B2 9/2019 Slessman et al.
10,490,055 B2 11/2019 Myllymäki
10,503,180 B2 12/2019 Blackley
10,529,215 B2 1/2020 Brown
10,531,538 B2 1/2020 Beghelli
10,563,886 B2 2/2020 McCormick et al.
10,632,331 B2 4/2020 Mele
10,639,508 B2 5/2020 Müller et al.
10,738,943 B2 8/2020 Tilhof
10,787,803 B2 9/2020 Leahy
10,789,665 B2 9/2020 Comello
10,808,396 B2 10/2020 Zhang et al.
10,834,482 B2 11/2020 Speicher et al.
10,890,294 B2 1/2021 Santos et al.
10,901,373 B2 1/2021 Locke et al.
10,969,131 B2 4/2021 Sinha et al.
11,009,186 B2 5/2021 Sung
11,027,236 B2 6/2021 Maayan et al.
11,045,800 B1 6/2021 Kaplan et al.
11,055,973 B2 7/2021 Wedig et al.
11,070,390 B2 7/2021 Park et al.
11,111,767 B2 9/2021 Anders
11,135,461 B2 10/2021 Beechy et al.
11,162,181 B2 11/2021 Harano et al.
11,181,875 B2 11/2021 Kummer et al.
11,185,650 B2 11/2021 Almqvist
11,187,223 B2 11/2021 Ward et al.
11,191,222 B2 12/2021 Cho et al.
11,226,604 B2 1/2022 Goyal
11,238,187 B2 2/2022 Nikolayev et al.
11,391,474 B2 7/2022 Eplee
11,410,539 B2 8/2022 Kasiviswanathan
11,426,553 B2 8/2022 Dube et al.
11,439,856 B2 9/2022 Laskaris et al.
11,514,764 B2 11/2022 Correnti et al.
11,536,476 B2 12/2022 Nesler et al.
11,626,002 B2 4/2023 Donegan et al.
11,719,625 B2 8/2023 Carras et al.
11,768,138 B2 9/2023 Jamison et al.
11,810,216 B1 11/2023 Foiles et al.
11,964,269 B2 4/2024 Kaplan et al.
12,046,125 B2 7/2024 Nalukurthy et al.
12,339,267 B2 6/2025 Lazea et al.
12,345,433 B2 7/2025 Pham et al.
12,411,118 B2 9/2025 Mcmanus et al.
12,440,714 B2 10/2025 Schmitt et al.
2001/0032892 A1 10/2001 Brooks et al.
2002/0121381 A1 9/2002 Reilly
2002/0185283 A1 12/2002 Taylor
2003/0183300 A1 10/2003 Siebert
2004/0045350 A1 3/2004 Jones et al.
2005/0066711 A1 3/2005 Discenzo
2005/0280527 A1 12/2005 Farley
2006/0005880 A1 1/2006 Baker et al.
2006/0173579 A1 8/2006 Desrochers et al.
2006/0173580 A1 8/2006 Desrochers et al.
2006/0196254 A1 9/2006 Fjerdingstad
2006/0213513 A1 9/2006 Seong
2006/0234621 A1 10/2006 Desrochers et al.
2007/0017520 A1 1/2007 Gale et al.
2007/0163578 A1 7/2007 Lisle
2007/0175470 A1 8/2007 Brookman et al.
2008/0041377 A1 2/2008 Turiello
2008/0041378 A1 2/2008 Turiello
2008/0041379 A1 2/2008 Turiello
2008/0105443 A1 5/2008 Molz et al.
2008/0236846 A1 10/2008 Gamble et al.
2009/0058669 A1 3/2009 Santos
2009/0159365 A1 6/2009 O'Brien
2009/0178675 A1 7/2009 Turiello
2009/0283151 A1 11/2009 Turiello
2010/0031955 A1 2/2010 Turiello
2010/0032040 A1 2/2010 Turiello
2010/0081411 A1 4/2010 Montenero
2010/0084043 A1 4/2010 Turiello
2010/0147297 A1 6/2010 Brewer et al.
2010/0154922 A1 6/2010 Turiello
2010/0201536 A1 8/2010 Robertson et al.
2011/0187524 A1 8/2011 Cochran, III
2011/0192479 A1 8/2011 Yokota
2011/0259198 A1 10/2011 Kim et al.
2011/0259580 A1 10/2011 Head
2011/0277490 A1 11/2011 Meirav
2012/0031525 A1 2/2012 Wonders
2012/0215488 A1 8/2012 Carter et al.
2012/0266889 A1 10/2012 Roberts
2013/0033377 A1 2/2013 Hoseit
2013/0086933 A1 4/2013 Holtkamp et al.
2013/0087153 A1 4/2013 Jung
2013/0105010 A1 5/2013 McLoughlin
2014/0077110 A1 3/2014 Gamard
2014/0188286 A1 7/2014 Hunka
2014/0232876 A1 8/2014 Dougherty
2014/0261406 A1 9/2014 Fabian
2014/0338927 A1 11/2014 Palle
2014/0349707 A1 11/2014 Bang
2015/0033765 A1 2/2015 Blalock
2015/0077737 A1 3/2015 Belinsky et al.
2015/0096768 A1 4/2015 DuBrucq et al.
2015/0130205 A1 5/2015 Caskey
2015/0131262 A1 5/2015 Mabry
2015/0170486 A1 6/2015 Penland
2015/0204484 A1 7/2015 Modirzareh et al.
2015/0217518 A1 8/2015 Chun et al.
2015/0330873 A1 11/2015 Atchison
2015/0369498 A1 12/2015 Motomura et al.
2016/0003524 A1 1/2016 Blalock
2016/0114196 A1 4/2016 Tribble
2016/0116181 A1 4/2016 Aultman et al.
2016/0121151 A1 5/2016 Schmitt et al.
2016/0133108 A1 5/2016 Bucsa et al.
2016/0136017 A1 5/2016 Caskey
2016/0138759 A1 5/2016 Rado et al.
2016/0197772 A1 7/2016 Britt et al.
2016/0334061 A1 11/2016 Toelle
2016/0343187 A1 11/2016 Trani
2017/0006107 A1 1/2017 Dawes et al.
2017/0084156 A1 3/2017 Myllymäki
2017/0122580 A1 5/2017 Karamanos et al.
2017/0180829 A1 6/2017 Schwarzkopf et al.
2017/0236397 A1 8/2017 Myslenski et al.
2017/0303580 A1 10/2017 Cameron et al.
2017/0310498 A1 10/2017 Brandman et al.
2018/0181094 A1 6/2018 Funk et al.

(56) References Cited

U.S. PATENT DOCUMENTS

| | | | | |
|---|---|---|---|---|
| 2018/0197393 | A1 | 7/2018 | Gallo et al. | |
| 2018/0200552 | A1 | 7/2018 | Wertsberger | |
| 2018/0243591 | A1 | 8/2018 | DeWitt | |
| 2018/0283614 | A1 | 10/2018 | Gandolfo | |
| 2018/0363939 | A1 | 12/2018 | Mccormick et al. | |
| 2018/0375444 | A1 | 12/2018 | Gamroth | |
| 2019/0023529 | A1 | 1/2019 | Lau | |
| 2019/0103986 | A1 | 4/2019 | Brandman et al. | |
| 2019/0143161 | A1 | 5/2019 | Burkhart et al. | |
| 2019/0171780 | A1 | 6/2019 | Santarone et al. | |
| 2019/0174208 | A1 | 6/2019 | Speicher et al. | |
| 2019/0203885 | A1 | 7/2019 | Sung | |
| 2019/0277449 | A1 | 9/2019 | Bourgeois et al. | |
| 2019/0282839 | A1 | 9/2019 | Wenzel et al. | |
| 2020/0012307 | A1 | 1/2020 | Scelzi | |
| 2020/0054905 | A1 | 2/2020 | Livchak et al. | |
| 2020/0107475 | A1 | 4/2020 | Keisling et al. | |
| 2020/0143300 | A1 | 5/2020 | Weldemariam et al. | |
| 2020/0225313 | A1 | 7/2020 | Coles | |
| 2020/0232309 | A1 | 7/2020 | Deutch et al. | |
| 2020/0294372 | A1 | 9/2020 | Rodriguez | |
| 2020/0334778 | A1 | 10/2020 | Lotter | |
| 2020/0349661 | A1 | 11/2020 | Dutta et al. | |
| 2021/0023323 | A1 | 1/2021 | Wilkinson et al. | |
| 2021/0038926 | A1 | 2/2021 | Reedy | |
| 2021/0113864 | A1 | 4/2021 | Nam | |
| 2021/0183218 | A1 | 6/2021 | Johnson et al. | |
| 2021/0237309 | A1 | 8/2021 | Tessien | |
| 2021/0241595 | A1 | 8/2021 | Young et al. | |
| 2021/0268322 | A1 | 9/2021 | Thomas et al. | |
| 2021/0280034 | A1 | 9/2021 | Wedig et al. | |
| 2021/0297336 | A1 | 9/2021 | Ramakrishnaiah et al. | |
| 2021/0299495 | A1 | 9/2021 | Feenstra et al. | |
| 2021/0311008 | A1 | 10/2021 | Hill | |
| 2021/0358238 | A1 | 11/2021 | Rogers et al. | |
| 2021/0379429 | A1 | 12/2021 | Darnell | |
| 2022/0010996 | A1 | 1/2022 | Carrieri | |
| 2022/0019186 | A1 | 1/2022 | De Andrade et al. | |
| 2022/0099641 | A1 | 3/2022 | Desrochers | |
| 2022/0103914 | A1 | 3/2022 | Lotter | |
| 2022/0134147 | A1 | 5/2022 | Webb et al. | |
| 2022/0233900 | A1 | 7/2022 | Williams | |
| 2022/0260270 | A1 | 8/2022 | Abate et al. | |
| 2022/0297110 | A1 | 9/2022 | Kaplan et al. | |
| 2022/0404056 | A1 | 12/2022 | Bloemer et al. | |
| 2023/0034481 | A1 | 2/2023 | Benton et al. | |
| 2023/0070772 | A1 | 3/2023 | Bingham et al. | |
| 2023/0173128 | A1 | 6/2023 | Slotkin et al. | |
| 2023/0298346 | A1 | 9/2023 | Alshammary | |
| 2023/0319241 | A1 | 10/2023 | Turiello et al. | |
| 2024/0001161 | A1 | 1/2024 | Turiello | |
| 2024/0001178 | A1* | 1/2024 | Turiello | G01N 33/0031 |
| 2024/0005773 | A1* | 1/2024 | Turiello | G01N 33/0031 |
| 2024/0036537 | A1 | 2/2024 | Gupta et al. | |
| 2025/0216034 | A1 | 7/2025 | Despres et al. | |

FOREIGN PATENT DOCUMENTS

| | | | |
|---|---|---|---|
| AU | 2021105506 | A4 | 11/2021 |
| CA | 2760676 | A1 | 11/2010 |
| CN | 101853549 | A | 10/2010 |
| CN | 101968244 | A | 2/2011 |
| CN | 201775882 | U | 3/2011 |
| CN | 202052220 | U | 11/2011 |
| CN | 202078672 | U | 12/2011 |
| CN | 202615547 | U | 12/2012 |
| CN | 102739786 | B | 4/2013 |
| CN | 101298769 | B1 | 8/2013 |
| CN | 203154649 | U | 8/2013 |
| CN | 203160791 | U | 8/2013 |
| CN | 203190560 | U | 9/2013 |
| CN | 102364016 | B | 2/2014 |
| CN | 102500021 | B | 7/2014 |
| CN | 203799482 | U | 8/2014 |
| CN | 102365458 | B | 9/2014 |
| CN | 104056374 | A | 9/2014 |
| CN | 204534128 | U | 6/2015 |
| CN | 104826248 | A | 8/2015 |
| CN | 104906717 | A | 9/2015 |
| CN | 205031799 | U | 2/2016 |
| CN | 104260763 | B | 8/2016 |
| CN | 105917208 | A | 8/2016 |
| CN | 106310553 | A | 1/2017 |
| CN | 106899665 | A | 6/2017 |
| CN | 105143778 | B | 8/2017 |
| CN | 105247269 | A | 9/2017 |
| CN | 206808757 | U | 12/2017 |
| CN | 107991999 | A | 5/2018 |
| CN | 105892538 | B | 8/2018 |
| CN | 207750720 | U | 8/2018 |
| CN | 106546008 | A | 9/2018 |
| CN | 105091097 | B | 1/2019 |
| CN | 105547285 | A | 1/2019 |
| CN | 208536257 | U | 2/2019 |
| CN | 109859368 | A | 6/2019 |
| CN | 109939387 | A | 6/2019 |
| CN | 110469950 | A | 11/2019 |
| CN | 110478804 | A | 11/2019 |
| CN | 110494811 | A | 11/2019 |
| CN | 110673739 | A | 1/2020 |
| CN | 209926530 | U | 1/2020 |
| CN | 210135667 | U | 3/2020 |
| CN | 111210588 | A | 5/2020 |
| CN | 210739978 | U | 6/2020 |
| CN | 111544817 | A | 8/2020 |
| CN | 110047240 | B | 10/2020 |
| CN | 109404582 | B | 11/2020 |
| CN | 112344484 | A | 2/2021 |
| CN | 212491267 | U | 2/2021 |
| CN | 112657081 | A | 4/2021 |
| CN | 108295407 | B | 5/2021 |
| CN | 111258251 | A | 5/2021 |
| CN | 113365029 | A | 9/2021 |
| CN | 110493568 | B | 10/2021 |
| CN | 111243219 | A | 11/2021 |
| CN | 214550694 | U | 11/2021 |
| CN | 113769292 | A | 12/2021 |
| CN | 113842716 | A | 12/2021 |
| CN | 114146332 | A | 3/2022 |
| CN | 114205385 | A | 3/2022 |
| CN | 114235301 | A | 3/2022 |
| CN | 106678991 | B | 5/2022 |
| CN | 114613092 | A | 6/2022 |
| CN | 216855578 | U | 7/2022 |
| CN | 217526213 | U | 10/2022 |
| CN | 115645769 | A | 1/2023 |
| EP | 2320397 | B1 | 5/2012 |
| EP | 2 151 263 | B1 | 3/2014 |
| EP | 2 982 416 | A1 | 2/2016 |
| EP | 2373384 | B1 | 10/2018 |
| GB | 2248884 | A | 4/1992 |
| JP | H06-343709 | A | 12/1994 |
| JP | H08-124064 | A | 5/1996 |
| JP | 3397382 | B2 | 4/2003 |
| JP | 2004-298554 | A | 10/2004 |
| JP | 2005291634 | A | 10/2005 |
| JP | 5117700 | B2 | 1/2013 |
| JP | 5654124 | B2 | 1/2015 |
| JP | 5719010 | B2 | 5/2015 |
| JP | 6189404 | B2 | 8/2017 |
| JP | 6321134 | B2 | 5/2018 |
| JP | 2021186616 | A | 12/2021 |
| JP | 7109988 | B2 | 8/2022 |
| KR | 20050097400 | A | 10/2005 |
| KR | 100880023 | B1 | 2/2009 |
| KR | 10-2010-0012689 | A | 2/2010 |
| KR | 100945260 | B1 | 3/2010 |
| KR | 10-2010-0115024 | A | 10/2010 |
| KR | 101024944 | B1 | 3/2011 |
| KR | 20110078600 | A | 7/2011 |
| KR | 10-1088547 | B1 | 11/2011 |
| KR | 20110002589 | U | 11/2011 |
| KR | 101089513 | B1 | 12/2011 |
| KR | 101208662 | B1 | 12/2012 |

(56) References Cited

FOREIGN PATENT DOCUMENTS

| | | | |
|---|---|---|---|
| KR | 20130017610 | A | 8/2013 |
| KR | 101722045 | B1 | 3/2017 |
| KR | 101747360 | B1 | 6/2017 |
| KR | 101762550 | B1 | 7/2017 |
| KR | 10-1840682 | B1 | 10/2017 |
| KR | 101790694 | B1 | 11/2017 |
| KR | 20170138810 | A | 12/2017 |
| KR | 101815533 81 | | 1/2018 |
| KR | 101841954 | B1 | 3/2018 |
| KR | 101845263 | B1 | 4/2018 |
| KR | 101845264 | B1 | 5/2018 |
| KR | 101859878 81 | | 5/2018 |
| KR | 101859955 | B1 | 5/2018 |
| KR | 101887164 | B1 | 9/2018 |
| KR | 101902976 | B1 | 10/2018 |
| KR | 10-2019-0043669 | A | 4/2019 |
| KR | 20180001140 | U | 6/2019 |
| KR | 101996949 | B1 | 7/2019 |
| KR | 102008625 | B1 | 8/2019 |
| KR | 101994222 | B1 | 9/2019 |
| KR | 102035835 | B1 | 10/2019 |
| KR | 10-2019-0131158 | A | 11/2019 |
| KR | 102050539 | B1 | 12/2019 |
| KR | 10-2020-0027390 | A | 3/2020 |
| KR | 102169547 | B1 | 10/2020 |
| KR | 102263178 | B1 | 6/2021 |
| KR | 102277919 | B1 | 7/2021 |
| KR | 102300167 | B1 | 9/2021 |
| KR | 102355909 | B1 | 2/2022 |
| KR | 20220056659 | A | 5/2022 |
| NL | 2019479 | B1 | 8/2018 |
| RU | 74076 | U | 6/2008 |
| RU | 2465933 | C2 | 11/2012 |
| RU | 2717525 | C1 | 3/2020 |
| RU | 2724093 | C1 | 6/2020 |
| TW | 201425832 | A | 9/2015 |
| TW | M540352 | U | 4/2017 |
| WO | 2003031892 | A1 | 4/2003 |
| WO | 2006047246 | A2 | 5/2006 |
| WO | 2008021538 | A2 | 2/2008 |
| WO | 2010063266 | A1 | 6/2010 |
| WO | 2011034334 | A2 | 3/2011 |
| WO | 2014208865 | A1 | 12/2014 |
| WO | 2016205053 | A1 | 12/2016 |
| WO | 2018038434 | A1 | 3/2018 |
| WO | 2018176196 | A1 | 10/2018 |
| WO | 2018236571 | A1 | 12/2018 |
| WO | WO-2021/250389 | A1 | 12/2021 |
| WO | 2022066099 | A1 | 3/2022 |
| WO | 2023000087 | A1 | 1/2023 |

OTHER PUBLICATIONS

ENMET—Product Information, "Compressed Airline Monitors & Respiratory Air Monitors & Portable Breathing Air Systems," 2025 (2 pages).

Kinaeva et al., "Machine Learning Algorithms for Regression Analysis and Predictions of Numerical Data," 2021 3rd International Congress on Human-Computer Interaction, Optimization and Robotic Applications, 2021 (pp. 1-6).

Rush III, J.D., "Monitor Your Air Supply" Fire Engineering, 2014 (2 pages).

Trevino, "What Every Firefighter Needs to Know About FARS," Fire Apparatus & Emergency Equipment, 2016 (pp. 1-8).

"Influence of Internal Gas Pipelines Built into the Structure on the Safety of Residents and Energy Eficiency Factors of the Buildings", Published at Latvian Journal of Physics and Technical Sciences, Published on [Oct. 2022] http://surl.li/fdzun.

"Indoor air quality in green buildings: A case-study in a residential high-rise building in the northeastern United States", Published at Journal of Environmental Science and Health, Published on [Feb. 2015] http://surl.li/fdzxk.

"Indoor Air-Quality Data-Monitoring System: Long-Term Monitoring Benefits", Published at MDIP, Published on [Sep. 25, 2019] https://www.mdpi.com/1424-8220/19/19/4157.

"A review of air filtration technologies for sustainable and healthy building ventilation", Published at Sustainable Cities and Society, Published on [Jul. 2017] https://core.ac.uk/download/pdf/84587706.pdf.

"A novel constant-air-volume range hood for high-rise residential buildings with 2 central shaft", Published at Energy and Buildings, Published on [May 2021] http://surl.li/feadf.

"Thermodynamic performance evaluation of HFC refrigerants for the chiller system simulated by hot gas bypass cycle", Published at ZANCO Journal of Pure and Applied Sciences, Published on [Dec. 28, 2017] http://surl.li/feadr.

"An Automatic and Accurate Localization System for Firefighters", Published at Third International Conference on Internet-of-Things Design and Implementation (IoTDI), Published on [May 28, 2018] https://www.cs.virginia.edu/~stankovic/psfiles/breadcrumb_localization.pdf.

"Fire Safety", Published at Atomic Energy Regulatory Board India, Published on [May 2019] https://aerb.gov.in/images/PDF/fire.pdf.

"Fire Service Features of Buildings and Fire Protection Systems", Published at Occupational Safety and Health Administration (OSHA), Published on [Sep. 8, 2014] https://www.osha.gov/sites/default/files/publications/OSHA3256.pdf.

"A comprehensive review on indoor air quality monitoring systems for enhanced public health", Published at Sustainable Environment Research, Published on [Dec. 2020] https://sustainenvironres.biomedcentral.com/counter/pdf/10.1186/s42834-020-0047-y.pdf.

"Review of research on air-conditioning systems and indoor air quality control for human health", Published at International Journal of Refrigeration, Published on [Jan. 2009] https://sci-hub.hkvisa.net/10.1016/j.ijrefrig.2008.05.004.

"A review of the performance of different ventilation and airflow distribution systems in buildings", Published at Building and Environment, Published on [Dec. 18, 2013] https://www.academia.edu/27228820/A_review_of_the_performance_of_different_ventilation_and_airflow_distribution_systems_in_buildings.

"Real-time sensors for indoor air monitoring and challenges ahead in deploying them to urban buildings", Published at Science of the Total Environment , Published on [Apr. 2016] https://eprints.ncl.ac.uk/file_store/production/223286/749E8E7D-D1EF-4056-BCDD-F48812167CB1.pdf.

"Indoor air quality and energy management through real-time sensing in commercial buildings ", Published at Energy and Buildings, Published on [Jan. 2016] https://eprints.qut.edu.au/220977/1/93777.pdf.

"Compressors and Compressed Air Systems", Published at Continuing Education and Development, Found on [Mar. 2023] https://www.cedengineering.com/userfiles/Compressors%20and%20Compressed%20Air%20Systems%20R1.pdf.

"HVAC System", Published at Energy Conservation Building Code (ECBC) Tip Sheet, Published on [ Jun. 2009] https://www.keralaenergy.gov.in/files/HVAC_System_Tip_Sheet.pdf.

"Air distribution of oxygen supply through guardrail slot diffusers in high-altitude hypoxic areas", Published at Building and Environment, Published on [Apr. 2020] https://rb.gy/9ktde6.

"Air Quality Control in Mine Refuge Chamber with Ventilation through Pressure Air Pipeline", Published at Process Safety and Environmental Protection, Published on [Dec. 2019] https://uhra.herts.ac.uk/bitstream/handle/2299/23249/Manuscript.pdf;jsessionid=6F0E7E29FB3FF03D59759181BA6A6161?sequence=1.

International Search Report and Written Opinion for Appl. Ser. No. PCT/IB2024/050603 dated Apr. 24, 2024 (10 pages).

International Search Report and Written Opinion issued in connection with PCT/US2023/014763 dated Jun. 21, 2023 (8 pages).

International Search Report and Written Opinion issued in connection with PCT/US2023/014764 dated Jun. 23, 2023 (9 pages).

International Search Report and Written Opinion issued in connection with PCT/US2023/014765 dated Jun. 27, 2023 (10 pages).

International Search Report and Written Opinion issued in connection with PCT/US2023/017653 dated Jul. 24, 2023 (9 pages).

(56) References Cited

OTHER PUBLICATIONS

International Search Report and Written Opinion issued in connection with PCT/US2023/017656 dated Jul. 19, 2023 (10 pages).
International Search Report and Written Opinion issued in connection with PCT/US2023/017803 dated Jul. 24, 2023 (8 pages).
International Search Report and Written Opinion issued in connection with PCT/US2023/018401 dated Jul. 27, 2023 (10 pages).
International Search Report and Written Opinion issued in connection with PCT/US2023/019880 dated Aug. 2, 2023 (8 pages).
International Search Report and Written Opinion issued in connection with PCT/US2023/022222 dated Aug. 24, 2023 (11 pages).
International Search Report and Written Opinion issued in connection with PCT/US2023/022223 dated Sep. 4, 2023 (7 pages).
International Search Report and Written Opinion issued in connection with PCT/US2023/024766 dated Oct. 4, 2023 (7 pages).
International Search Report and Written Opinion issued in connection with PCT/US2023/025646 dated Oct. 11, 2023 (10 pages).
International Search Report and Written Opinion issued in connection with PCT/US2023/025647 dated Oct. 4, 2023 (10 pages).
International Search Report and Written Opinion issued in connection with PCT/US2023/026172 dated Oct. 31, 2023 (9 pages).
International Search Report and Written Opinion issued in connection with PCT/US2023/026174 dated Oct. 20, 2023 (7 pages).
International Search Report and Written Opinion issued in connection with PCT/US2023/026176 dated Oct. 17, 2023 (7 pages).
International Search Report and Written Opinion issued in connection with PCT/US2023/026425 dated Oct. 17, 2023 (12 pages).
International Search Report and Written Opinion issued in connection with PCT/US2023/026428 dated Oct. 17, 2023 (8 pages).
International Search Report and Written Opinion issued in connection with PCT/US2023/026466 dated Nov. 1, 2023 (8 pages).
"Chapter 6 Fire-Fighting Systems" https://www.globalsecurity.org/military/library/policy/navy/nrtc/14057_ppr_ch6.pdf.
"Research and Perspectives on Fire-Fighting Systems in Tunnels under Strong Piston Wind Action", by Xiaoyi Zhao et al., Published at Construction Management, and Computers & Digitization, Published on [Jan. 31, 2023] https://www.mdpi.com/2075-5309/13/2/435.
"Wireless sensor network applications in monitoring and control of gas networks", by Sajad Balali Dehkordi et al., Published at Majlesi Journal of Telecommunication Devices , Published on [Jun. 23, 2012] https://mjtd.isfahan.iau.ir/article_695667_a4c0e30293098b0ac5497f27c43f5bb9.pdf.
"Sustainability of Air Supply in Areas Immediately Dangerous to Life and Health", by Christopher W. Norris, Published at Northampton Fire Department,MA , Published in [Feb. 2008] https://apps.usfa.fema.gov/pdf/efop/efo41710.pdf.
"Sensor-based safety management", by Amin Asadzadeh et al., Published at Automation in Construction , Published on [Feb. 7, 2020] https://sci-hub.hkvisa.net/10.1016/j.autcon.2020.103128.
"Remote Monitoring and Control Using Mobile Phones", by Dr. Mikael Sjodin, Published at Newline Information , Published in [Nov. 2001] http://www.es.mdh.se/pdf_publications/413.pdf.
"Monitored Performance of an Office BuildingWith an Under-Floor Air Distribution System", by Christine E. Walker et al., Published at Fifth International Conference for Enhanced Building Operations, Pittsburgh, Pennsylvania , Published on [Oct. 13, 2005] https://oaktrust.library.tamu.edu/bitstream/handle/1969.1/5105/ESL-IC-05-10-13.pdf?sequence=4.
"Investigating Accessibility of Social Security System (SSS) Mobile Application: A Structural Equation Modeling Approach", Yung-Tsan Jou, Published at Sustainability 2022, Published on [Jun. 29, 2022] https://www.mdpi.com/2071-1050/14/13/7939.
"Firefighter Fatalities in the US in 2021", by Richard Campbell et al., Published at National Fire Protection Association (NFPA), Published in [Jun. 2023] https://www.nfpa.org/-/media/Files/News-and-Research/Fire-statistics-and-reports/Emergency-responders/osFFF.pdf.
"Reversible Longitudinal Smoke Extraction System in Enclosed Underground Parking Structure", by KongKok Haw, Published at Journal of Advanced Research in Fluid Mechanics and Thermal Sciences, Published on [Mar. 2, 2019] https://www.akademiabaru.com/submit/index.php/arfmts/article/view/2470/1450.
"Mapping Fire and Firefighter Visibility for Improving Situational Awareness", by Katherine Ann Mistick, Published at the University of Utah ProQuest Dissertations , Published in [May 2022] https://www.proquest.com/openview/089c0ac0998979da3b550b77ddee2bf1/1?pq-origsite=gscholar&cbl=18750&diss=y.
"An ultra-wide band indoor personnel tracking system for emergency situations (Europcom)", by Anthony Putorti Jr. et al., Published at Radar Conference, 2008. EuRAD 2008. European, Published in [Dec. 2008] http://surl.li/hqxep.
"Threat modeling in smart firefighting systems: Aligning MITRE ATT&CK matrix and NIST security controls", Shahzaib Zahid et al., Published at Internet of Things, Published on [Mar. 21, 2023] https://tinyurl.com/msjusd3y.
"Autonomous Fire Suppression Systemfor Use in High and Low VisibilityEnvironments by Visual Servoing", by Joshua G. McNeil et al., Published at Fire Technology 2016, Published on [ Jan. 7, 2016] https://sci-hub.hkvisa.net/10.1007/s10694-016-0564-8.
"Breathing Limited Air Situational Training Masks (BlastMask) Versus SelfContained Breathing Apparatus (SCBA) for Firefighters: A Pilot Study", by Thomas L. Andre et al., Published at International journal of exercise science, Published in [2019] https://digitalcommons.wku.edu/cgi/viewcontent.cgi?article=2498&context=ijes.
"Internet of Things technology for fire monitoring system", by S.R.Vijayalakshmi et al., Published at international Research Journal of Engineering and Technology (IRJET), Published on [Jun. 6, 2017] https://www.irjet.net/archives/V4/16/IRJET-V4I6418.pdf.
"Firefighter Safety Using IoT", by Caroline Jebakumari S et al., Published at Recent Trends in Intensive Computing, Published in [Dec. 2021] https://www.researchgate.net/publication/356753949_Firefighter_Safety_Using_IoT/fulltext/61aa2f9e50e22929cd4342f7/Firefighter-Safety-Using-IoT.pdf.
"A smart fire detection system using IoT technology with automatic water sprinkler", by Hamood Alqourabah et al., Published at International Journal of Electrical and Computer Engineering (IJECE), Published on [ Mar. 5, 2021] https://pdfs.semanticscholar.org/f3e7/a7c0cf2d448be592421045033506e845e6c2.pdf.
"Route Planning for Fire Rescue Operations in Long-Term Care Facilities Using Ontology and Building Information Models", by Ru-Guan Wang et al., Published at Building Information Modelling. Semantic Web and Internet-of-Things for Smart Cities, Published on [Jul. 21, 2022] https://www.mdpi.com/2075-5309/12/7/1060?type=check_update&version=2.
"Rescue Air for Firefighters", Published at Fire Engineering. Published on [Sep. 8, 2014] https://rescueair.com/wp-content/uploads/2020/03/rescue-air-for-firefighters.whitepaperpdf.render.pdf.
"The Case for Interior High-Rise Breathing Air Systems", Published at Fire Engineering, Published on [Apr. 2012] https://rescueair.com/wp-content/uploads/2014/05/Rush-Article.pdf.
"RF Based Advance Smart Fire Safety System for Industries and Shopping Malls", Published at International Journal of Science and Research (IJSR), Published on [Dec. 2018] https://www.ijsr.net/archive/v7/12/ART20193898.pdf.
"Design and Implementation of Car Fire Detection and Automatic Car Door Opening Using IOT", Published at International Journal of Advances in Engineering and Management (IJAEM), Published on [ Jul. 7, 2022] https://ijaem.net/issue_dcp/Design%20and%20Implementation%20of%20Car%20Fire%20Detection%20and%20Automatic%20Car%20Door%20Opening%20Using%20Iot.pdf.
"Machine Vision Based Fire Detection Techniques: A Survey", Published al Springer Nature, Published on [Nov. 27, 2020] https://sci-hub.hkvisa.net/10.1007/s10694-020-01064-z.
"An Analysis of Firefighter Breathing Air Replenishment Systems", Published at Fire Protection Research Foundation, Published o[Apr. 2021] https://www.nfpa.org/-/media/Files/News-and-Research/Fire-statistics-and-reports/Emergency-responders/RFFAnalysisOfFFBARS.pdf.
"Fire Detection Systems in Wireless Sensor Networks", Published at World Conference on Technology, Innovation and Entrepreneur-

(56) References Cited

OTHER PUBLICATIONS ship, Published on [Jul. 3, 2015] https://www.sciencedirect.com/science/article/pii/S1877042815038872.
"Fire Safety System Building", Published al IOP Conference Series: Materials Science and Engineering, Published on [Nov. 2019] https://www.researchgate.net/publication/337402246_Fire_Safety_System_Building/fulltext/5dd573ae299bf11ec866bf2c/Fire-Safety-System-Building.pdf.
"SmartFire: Intelligent Platform for Monitoring Fire Extinguishers and Their Building Environment", Published at MDPI, Published on [May 25, 2019] https://www.mdpi.com/1424-8220/19/10/2390.
"A Smart Fire Detection System using IoT Technology With Automatic Water Sprinkler", Published at International Journal of Electrical and Computer Engineering (IJECE), Published on [Oct. 7, 2020] http://surl.li/esuhn.
"Situational Awareness for first responders:Evaluation of the BIMS field trial", Published at IEEE Xplore, Published on [Dec. 9, 2009] http://surl.li/esuid.
"Fire Safety in Buildings", Published at Journal of Civil & Environmental Engineering, Published on [Jan. 2017] https://www.researchgate.net/profile/Noah-Akhimien/publication/328075851_Fire_Safety_in_Buildings/links/5bb62f01299bf1049b6f57d7/Fire-Safety-in-Buildings.pdf.
"Ignis: Fire Detection and Mitigation System", Published at International Research Journal of Engineering and Technology (IRJET) , Published on [Jun. 6, 2021 ] https://www.irjet.net/archives/V8/i6/IRJET-V8I6493.pdf.
"An Intelligent Fire Detection and Mitigation System Safe from Fire (SFF)s", Published at International Journal of Computer Applications, Published on [Jan. 2016] https://www.ijcaonline.org/research/volume133/number6/mobin-2016-ijca-907858.pdf.
"Smart Fire Alert System Using IOT", Published at International Research Journal of Modernization in Engineering Technology and Science, Published on [Mar. 3, 2022 ] https://www.irjmets.com/uploadedfiles/paper/issue_3_march_2022/20213/final/fin_irjmets1648303966.pdf.
"Johnson Controls Acquires Rescue Air Systems to Enhance Fire Suppression Portfolio", Published at TheBigRedGuide, Published on [Oct. 6, 2022] https://www.thebigredguide.com/docs/opdf/news/johnson-controls-acquires-rescue-air-systems-enhance-fire-suppression-portfolio-co-5246-ga-co-1665048943-ga.1665049545.pdf.
"5.07 Air Replenishment Systems (2019)", Published at San Francisco Fire Department Bureau of Fire Prevention & Investigation, Found Online on [Feb. 8, 2014] https://sf-fire.org/media/1220/download?inline.
"Summary of Compressed Air Samples from Firefighter Air Replenishment Systems (FARS)", Published at Firefighter Air Coalition, Published on [May 15, 2020] https://aircoalition.org/wp-content/uploads/2021/03/Trace-Analytics-FARS-Air-Quality-Report.pdf.
"Firefighter Air Replenishment Systems (FARS) Air Quality Fact Sheet", Published at Firefighter Air Coalition, Publish Online on [Feb. 8, 2014] https://aircoalition.org/wp-content/uploads/2021/03/FAC-FARS-Air-Quality-White-Paper.pdf.
"Technical Brief on System Controls for Industrial Compressed Air Systems", Published at Compressed Air and Gas Institute, Found Online on [Feb. 15, 2022] https://www.cagi.org/assets/documents/pdfs/SystemControlsTechnicalBrief.pdf?updated=1657712699.
"Case Study—System Controls", Published at Compressed Air and Gas Institute, Found Online on [Feb. 15, 2022] https://www.cagi.org/assets/documents/pdfs/SystemControlsCaseStudy.pdf?updated=1657712699.
"Technical Brief—Heat Recovery from Industrial Compressed Air Systems", Published at Compressed Air and Gas Institute, Found Online on [Feb. 15, 2022] https://www.cagi.org/assets/documents/pdfs/HeatRecoveryTechnicalBrief.pdf?updated=1657712699.
"Technical Brief on Distribution Piping Network", Published at Compressed Air and Gas Institute, Found Online on [Feb. 15, 2022] https://www.cagi.org/assets/documents/pdfs/DistributionPipingNetworkTechnicalBrief.pdf?updated=1657712699.
"Technical Brief on Pressure Drop", Published at Compressed Air and Gas Institute, Found Online on [Feb. 15, 2022] https://www.cagi.org/assets/documents/pdfs/PressureDropTechnicalBrief.pdf?updated=1657712700.
"Technical Brief on Variable Speed Drive", Published at Compressed Air and Gas institute, Found Online on [Feb. 15, 2022] https://www.cagi.org/assets/documents/pdfs/VariableSpeedDriveTechnicalBrief.pdf?updated=1657712699.
"Compressor Room Advantages with Oil-Free Centrifugal Air Compressors", Published at Compressed Air and Gas Institute, Found Online on [Feb. 15, 2022] https://www.cagi.org/pdf/downloads/compressor-room-advantages-with-oil-free-centrifugal-air-compressors.
"Preparing Reciprocating Air Compressors for Winter", Published at Compressed Air and Gas Institute, Found Online on [Feb. 15, 2022] https://www.cagi.org/pdf/downloads/preparing-reciprocating-air-compressors-for-winter.
"Nitrogen Characteristics and Benefits of On-Site Generation", Published at Compressed Air and Gas Institute, Found Online on [Feb. 15, 2022] https://www.cagi.org/pdf/downloads/19-nitrogen-characteristics-and-benefits-of-on-site-generation.
"Key Considerations for Installing Centrifugal Air Compressors", Published at Compressed Air and Gas Institute, Found Online on [Feb. 15, 2022] https://www.cagi.org/pdf/downloads/20-key-considerations-for-installing-centrifugal-air-compressors.
"Compressed Air & Gas Handbook", Published at Compressed Air and Gas Institute, Found Online on [Feb. 15, 2022] https://www.cagi.org/handbook-pdfs/handbook-chapter-1.
"Climate Change: Atmospheric Carbon Dioxide", Published at NOAA Climate, Publish on [Jun. 23, 2022] https://www.climate.gov/news-features/understanding-climate/climate-change-atmospheric-carbon-dioxide.
"Fire Hazard in Buildings: Review,Assessment and Strategies for Improving Fire Safety", Published at Emerald Insight, Publish on [Dec. 28, 2018] https://www.emerald.com/insight/content/doi/10.1108/PRR-12-2018-0033/full/pdf?title=fire-hazard-in-buildings-review-assessment-and-strategies-for-improving-fire-safety.
"Environmental Study of Firefighters", Published at University of California, Publish on [Sep. 8, 2015] https://sci-hub.hkvisa.net/10.1093/annhyg/35.6.581.
"Summary of human responses to ventilation", Published at California Digital Library University of Clifiornia, Publish on [Jun. 1, 2004] https://escholarship.org/content/qt64k2p4dc/qt64k2p4dc.pdf.
"Fixed Fire Protection Systems in Tunnels:Issues and Directions", Published at Fire Technology, Publish on [Sep. 30, 2010] https://sci-hub.hkvisa.net/10.1007/s10694-011-0220-2.
"Comparison of Underfloor Vs. Overhead Air Distribution Systems in an Office Building", Published at Department of Architecture, Waseda University, Found Online on [Feb. 15, 2022] https://www.airfixture.com/wp-content/uploads/2016/07/ASHRAE-Underfloor-vs-Overhead-Study.pdf.
"General Requirements in piping Design", Published at RMIT University in partnership with Informit Open, Publish on [Jul. 2021] https://search.informit.org/doi/epdf/10.3316/informil.947188479100130.
"Optimal operation of heat supply systems with piping network", Published at Department of Mechanical Engineering. Osaka Prefecture University, Publish on [ Oct. 14, 2016] https://sci-hub.hkvisa.net/10.1016/j.energy.2017.03.146.
"Compressed Air Piping Network Inspection and Documentation for PAROC", Published at Turku University of Applied Sciences, Found Online on [Feb. 15, 2022] https://www.theseus.fi/bitstream/handle/10024/122415/Myllyniemi_Jani.pdf?sequence=1.
"Natural Gas Pipeline Technology Overview", Publish at Argonne National Laboratory, Publish on [ Nov. 2007] https://publications.ant.gov/anlpubs/2008/02/61034.pdf.
"Improving the indoor air quality using the individual air supply system", Publish at Int. J. Environ. Sci. Technol., Publish on [ Jul. 24, 2017] https://link.springer.com/content/pdf/10.1007/s13762-017-1432-x.pdf?pdf=button.

(56) References Cited

OTHER PUBLICATIONS

"Analytical Modeling of Fire Smoke Spread in High-rise Buildings", Publish at Concordia University Montreal, Quebec, Canada Publish on [ Sep. 2016] https://core.ac.uk/download/pdf/211519293.pdf.

* cited by examiner

METHOD, DEVICE AND SYSTEM OF ACCESS CONTROL AND MANAGEMENT OF COMPONENTS OF A FIREFIGHTER AIR REPLENISHMENT SYSTEM HAVING BREATHABLE AIR SUPPLIED THEREACROSS

CLAIM OF PRIORITY

This application is a conversion application of, and claims priority to, U.S. Provisional Patent Application No. 63/356,996 titled CLOUD-BASED FIREFIGHTING AIR REPLENISHMENT MONITORING SYSTEM, SENSORS AND METHODS filed on Jun. 29, 2022, U.S. Provisional Patent Application No. 63/357,145 titled METHOD AND SYSTEM OF SENSOR-BASED SMART UNLOCKING OF A FIREFIGHTER AIR REPLENISHMENT SYSTEM filed on Jun. 30, 2022, and U.S. Provisional Patent Application No. 63/359,882 titled REMOTE MONITORING AND CONTROL OF A FIREFIGHTER AIR REPLENISHMENT SYSTEM THROUGH SENSORS DISTRIBUTED WITHIN COMPONENTS OF THE FIREFIGHTER AIR REPLENISHMENT SYSTEM filed on Jul. 11, 2022. The contents of each of the aforementioned applications are incorporated herein by reference in entirety thereof.

FIELD OF TECHNOLOGY

This disclosure relates generally to emergency systems and, more particularly, to a method, a device and/or a system of access control and management of components of a safety system of a structure having breathable air supplied thereacross.

BACKGROUND

A structure (e.g., a vertical building, a horizontal building, a tunnel, marine craft) may have a Firefighter Air Replenishment System (FARS) implemented therein. The FARS may have components therein such as an emergency air fill station to enable firefighters and/or emergency personnel access breathable air therethrough and an air storage system serving as a source of the breathable air. One or more of the component(s) may be accessed by maintenance personnel, emergency personnel and/or firefighters during routine operations and/or emergencies. The aforementioned personnel may utilize one or more access key(s) (e.g., metallic keys, smart keys) to access the one or more component(s) of the FARS. Unauthorized access of the one or more component(s) may lead to dangerous situations. Moreover, tracking the dispensing of the access keys to several personnel may prove to be tedious.

SUMMARY

Disclosed are a method, a device and/or a system of access control and management of components of a safety system of a structure having breathable air supplied thereacross.

In one aspect, a method of a safety system of a structure having breathable air supplied thereacross via a fixed piping system implemented therein is disclosed. The method includes executing a computing platform on a data processing device, and integrating the computing platform with one or more sensor(s) associated with one or more component(s) of the safety system related to access of the breathable air supplied across the safety system. The method also includes, in accordance with the execution of the computing platform on the data processing device and the integration thereof with the one or more sensor(s), through the data processing device, controlling access of the one or more component(s) of the safety system, and capturing, in conjunction with the one or more sensor(s), one or more parameter(s) of the access of the one or more component(s) of the safety system based on the control of the access.

In another aspect, a data processing device of a safety system of a structure having breathable air supplied thereacross via a fixed piping system implemented therein is disclosed. The data processing device includes a memory including instructions associated with a computing platform stored therein, and a processor communicatively coupled to the memory. The processor executes the instructions associated with the computing platform to integrate the computing platform with one or more sensor(s) associated with one or more component(s) of the safety system related to access of the breathable air supplied across the safety system. The processor also executes the instructions associated with the computing platform to, in accordance with the integration of the computing platform with the one or more sensor(s), control access of the one or more component(s) of the safety system, and capture, in conjunction with the one or more sensor(s), one or more parameter(s) of the access of the one or more component(s) of the safety system based on the control of the access.

In yet another aspect, a safety system of a structure having breathable air supplied thereacross via a fixed piping system implemented therein is disclosed. The safety system includes one or more component(s) related to access of the breathable air supplied across the safety system, one or more sensor(s) associated with the one or more component(s), and a data processing device executing instructions associated with a computing platform. The data processing device executes the instructions associated with the computing platform to integrate the computing platform with the at least one sensor, and, in accordance with the integration of the computing platform with the one or more sensor(s), control access of the at least one component, and capture, in conjunction with the one or more sensor(s), one or more parameter(s) of the access of the one or more component(s) based on the control of the access.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a device and/or a system of access control and management of components of a safety system of a structure having breathable air supplied thereacross. Although the present embodiments have been described with reference to specific example embodiments, it will be evident that various modifications and changes may be made to these embodiments without departing from the broader spirit and scope of the various embodiments.

Figure 1:
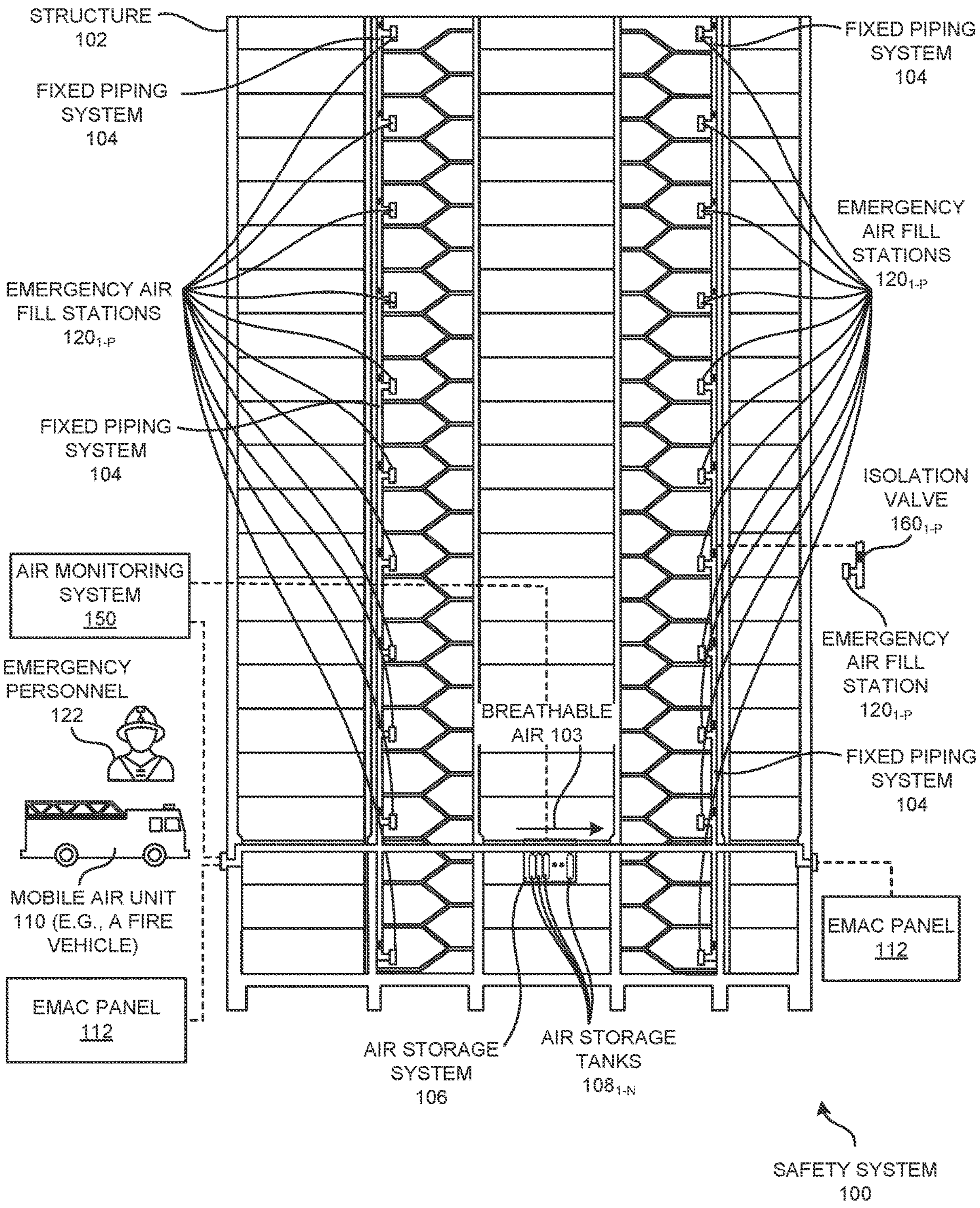
FIG. 1 is a schematic and an illustrative view of a safety system associated with a structure, according to one or more embodiments.

FIG. 1 shows a safety system 100 associated with a structure 102, according to one or more embodiments. In one or more embodiments, safety system 100 may be a Firefighter Air Replenishment System (FARS) to enable firefighters entering structure 102 in times of fire-related emergencies to gain access to breathable (e.g., human breathable) air (e.g., breathable air 103) in-house without the need of bringing in air bottles/cylinders to be transported up several flights of stairs of structure 102 or deep thereinto, or to refill depleted air bottles/cylinders that are brought into structure 102. In one or more embodiments, safety system 100 may supply breathable air provided from a supply of air tanks (to be discussed) stored in structure 102. When a fire department vehicle arrives at structure 102 during an emergency, breathable air supply typically may be provided through a source of air connected to said vehicle. In one or more embodiments, safety system 100 may enable firefighters to refill air bottles/cylinders thereof at emergency air fill stations (to be discussed) located throughout structure 102. Specifically, in some embodiments, firefighters may be able to fill air bottles/cylinders thereof at emergency air fill stations within structure 102 under full respiration in less than one to two minutes.

In one or more embodiments, structure 102 may encompass vertical building structures, horizontal building structures (e.g., shopping malls, hypermarts, extended shopping, storage and/or warehousing related structures), tunnels, marine craft (e.g., large marine vessels such as cruise ships, cargo ships, submarines and large naval craft, which may be "floating" versions of buildings and horizontal structures) and mines. Other structures are within the scope of the exemplary embodiments discussed herein. In one or more embodiments, safety system 100 may include a fixed piping system 104 permanently installed within structure 102 serving as a constant source of replenishment of breathable air 103. Fixed piping system 104 may be regarded as being analogous to a water piping system within structure 102 or another structure analogous thereto for the sake of imaginative convenience.

As shown in FIG. 1, fixed piping system 104 may distribute breathable air 103 across floors/levels of structure 102. For the aforementioned purpose, fixed piping system 104 may distribute breathable air 103 from an air storage system 106 (e.g., within structure 102) including a number of air storage tanks $\mathbf{108}_{1\text{-}N}$ that serve as sources of pressurized/compressed air (e.g., breathable air 103). Additionally, in one or more embodiments, fixed piping system 104 may interconnect with a mobile air unit 110 (e.g., a fire vehicle) through an External Mobile Air Connection (EMAC) panel 112.

In one or more embodiments, EMAC panel 112 may be a boxed structure (e.g., exterior to structure 102) to enable the interconnection between mobile air unit 110 and safety system 100. For example, mobile air unit 110 may include an on-board air compressor to store and replenish pressurized/compressed air (e.g., breathable air analogous to breathable air 103) in air bottles/cylinders (e.g., utilizable with Self-Contained Breathing Apparatuses (SCBAs) carried by firefighters). Mobile air unit 110 may also include other pieces of air supply/distribution equipment (e.g., piping and/or air cylinders/bottles) that may be able to leverage the sources of breathable air 103 within safety system 100 through EMAC panel 112. Firefighters, for example, may be able to fill breathable air (e.g., breathable air 103, breathable air analogous to breathable air 103) into air bottles/cylinders (e.g., spare bottles, bottles requiring replenishment of breathable air) carried on mobile air unit 110 through safety system 100.

In FIG. 1, EMAC panel 112 is shown at two locations merely for the sake of illustrative convenience. In one or more embodiments, an air monitoring system 150 may be installed as part of safety system 100 to automatically track and monitor a parameter (e.g., pressure) and/or a quality (e.g., indicated by moisture levels, carbon monoxide levels) of breathable air 103 within safety system 100. FIG. 1 shows air monitoring system 150 as communicatively coupled to air storage system 106 and EMAC panel 112 merely for the sake of example. It should be noted that EMAC panel 112 may be at a remote location associated with (e.g., internal to, external to) structure 102. In one or more embodiments, for monitoring the parameters and/or the quality of breathable air within safety system 100, air monitoring system 150 include appropriate sensors and circuitries therein. For example, a pressure sensor (to be discussed) within air monitoring system 150 may automatically sense and record a pressure of breathable air 103 of safety system 100. Said pressure sensor may communicate with an alarm system that is triggered when the sensed pressure is outside a safety range. Also, in one or more embodiments, air monitoring system 150 may automatically trigger a shutdown of breathable air distribution through safety system 100 in case of impurity/contaminant (e.g., carbon monoxide) detection therethrough yielding levels above a safety/predetermined threshold.

In one or more embodiments, fixed piping system 104 may include pipes (e.g., constituted out of stainless steel tubing) that distribute breathable air 103 to a number of emergency air fill stations $\mathbf{120}_{1\text{-}P}$ within structure 102. In one example implementation, each emergency air fill station $\mathbf{120}_{1\text{-}P}$ may be located at a specific level of structure 102. If structure 102 is regarded as a vertical building structure, an emergency air fill station $120_{1-P}$ may be located at each of a basement level, a first floor level, a second floor level and so on. For example, emergency air fill station $120_{1-P}$ may be located at the end of the flight of stairs that emergency fighting personnel (e.g., firefighting personnel) need to climb to reach a specific floor level within the vertical building structure.

In one or more embodiments, an emergency air fill station $120_{1-P}$ may be a static location within a level of structure 102 that provides emergency personnel 122 (e.g., firefighters, emergency responders) with the ability to rapidly fill air bottles/cylinders (e.g., SCBA cylinders) with breathable air 103. In one or more embodiments, emergency air fill station $120_{1-P}$ may be an emergency air fill panel or a rupture containment air fill station. In one or more embodiments, proximate each emergency air fill station $120_{1-P}$, safety system 100 may include an isolation valve $160_{1-P}$ to isolate a corresponding emergency air fill station $120_{1-P}$ from a rest of safety system 100. For example, said isolation may be achieved through the manual turning of isolation valve $160_{1-P}$ proximate the corresponding emergency air fill station $120_{1-P}$ or remotely (e.g., based on automatic turning) from air monitoring system 150. In one example implementation, air monitoring system 150 may maintain breathable air supply to a subset of emergency air fill stations $120_{1-P}$ via fixed piping system 104 through control of a corresponding subset of isolation valves $160_{1-P}$ and may isolate the other emergency air fill stations $120_{1-P}$ from the breathable air supply. It should be noted that configurations and components of safety system 100 may vary from the example safety system 100 of FIG. 1.

Figure 2:
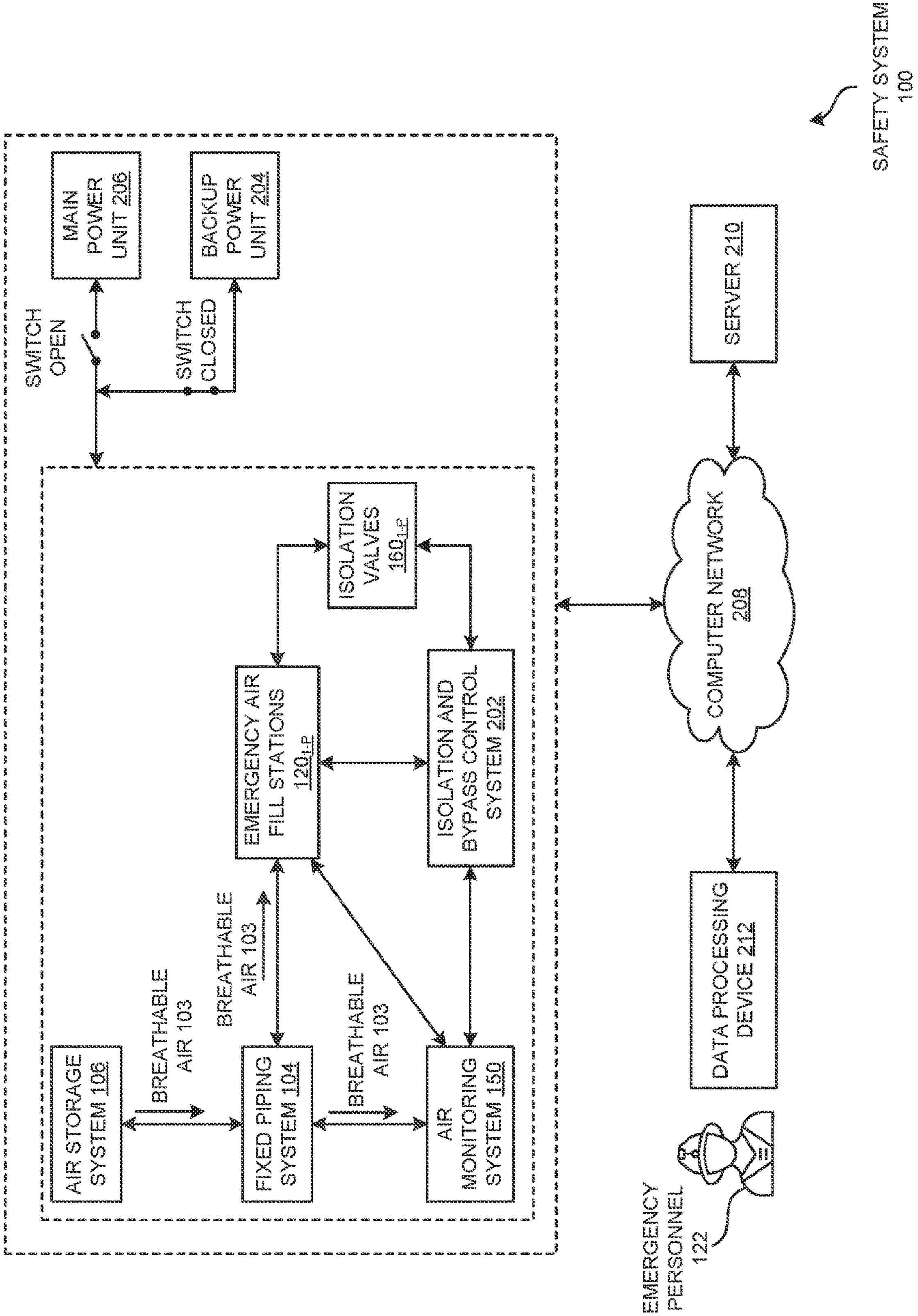
FIG. 2 is a schematic view of the safety system of FIG. 1 with elements thereof integrated therewithin in detail, according to one or more embodiments.

FIG. 2 shows safety system 100 with elements thereof integrated therewithin in detail, according to one or more embodiments. In one or more embodiments, safety system 100 may include air monitoring system 150 discussed above communicatively coupled to fixed piping system 104, to which emergency air fill stations $120_{1-P}$ are also coupled. In one or more embodiments, as seen above, the source of breathable air 103 may be air storage system 106. In one or more embodiments, safety system 100 may also include an isolation and bypass control system 202 that is constituted by a set of electrical, mechanical and/or electronic components working together to automatically include and/or bypass one or more emergency air fill station(s) $120_{1-P}$ based on detection of anomalous air parameters, as will be discussed below. For the aforementioned purpose, in one or more embodiments, isolation valve(s) $160_{1-P}$ associated with the aforementioned emergency air fill stations $120_{1-P}$ may be controlled (e.g., by opening or closing one or more of said isolation valves $160_{1-P}$) by isolation and bypass control system 202.

Further, in one or more embodiments, safety system 100 may include a backup power unit 204 (e.g., an electrical power system with electronic integration) to ensure uninterrupted power to components of safety system 100 during emergencies (e.g., a power cut, a mains power issue, a fire accident effected power issue). For the aforementioned purpose, in one or more embodiments, backup power unit 204 may be switched on in the case of a power related emergency with respect to a main power unit 206 (e.g., Alternating Current (AC) mains power, Direct Current (DC) power) associated with safety system 100.

In one or more embodiments, one or more or all of the abovementioned components of safety system 100 may be integrated with sensor(s) to detect parameters of use therewithin. In one or more embodiments, one or more of the aforementioned components may be communicatively coupled through a computer network 208 (e.g., a Local Area Network (LAN), a Wide Area Network (WAN), a cloud computing network, a short-range communication network based on Bluetooth®, WiFi® and the like) to a remote server 210 (e.g., a network of servers, a single server, a distributed network of servers, a command room server associated with safety system 100 and so on). As will be discussed below, in one or more embodiments, server 210 may obtain said parameters of use and other data from safety system 100 and perform analysis (e.g., predictive, non-predictive) thereof.

In addition, in one or more embodiments, safety system 100 may include a data processing device 212 (e.g., a mobile phone, a tablet, an iPad®, a laptop, a desktop) also communicatively coupled to one or more components or each component of safety system 100 and server 210 through computer network 208. Thus, in one or more embodiments, one or more components or each component of safety system 100 may have interfaces (not explicitly shown) for wireless communication through computer network 208. Also, as will be discussed below, in one or more embodiments, wherever possible, elements (e.g., handheld Thermal Imaging Cameras (TICs), portable TICs, aerial TICs, video cameras, output audio devices, output light devices, one or more or all sensors discussed herein) may be Internet of Things (IoT) devices capable of collecting and feeding data to server 210 through computer network 208. In one or more embodiments, IoT devices (or IoT enabled devices) may be devices and/or components with programmable hardware that can transmit data over computer networks (e.g., computer network 208 such as the Internet and/or other networks); said IoT devices may include or be associated with edge devices (not shown) to control data flow at the boundaries to computer network 208.

Figure 3:
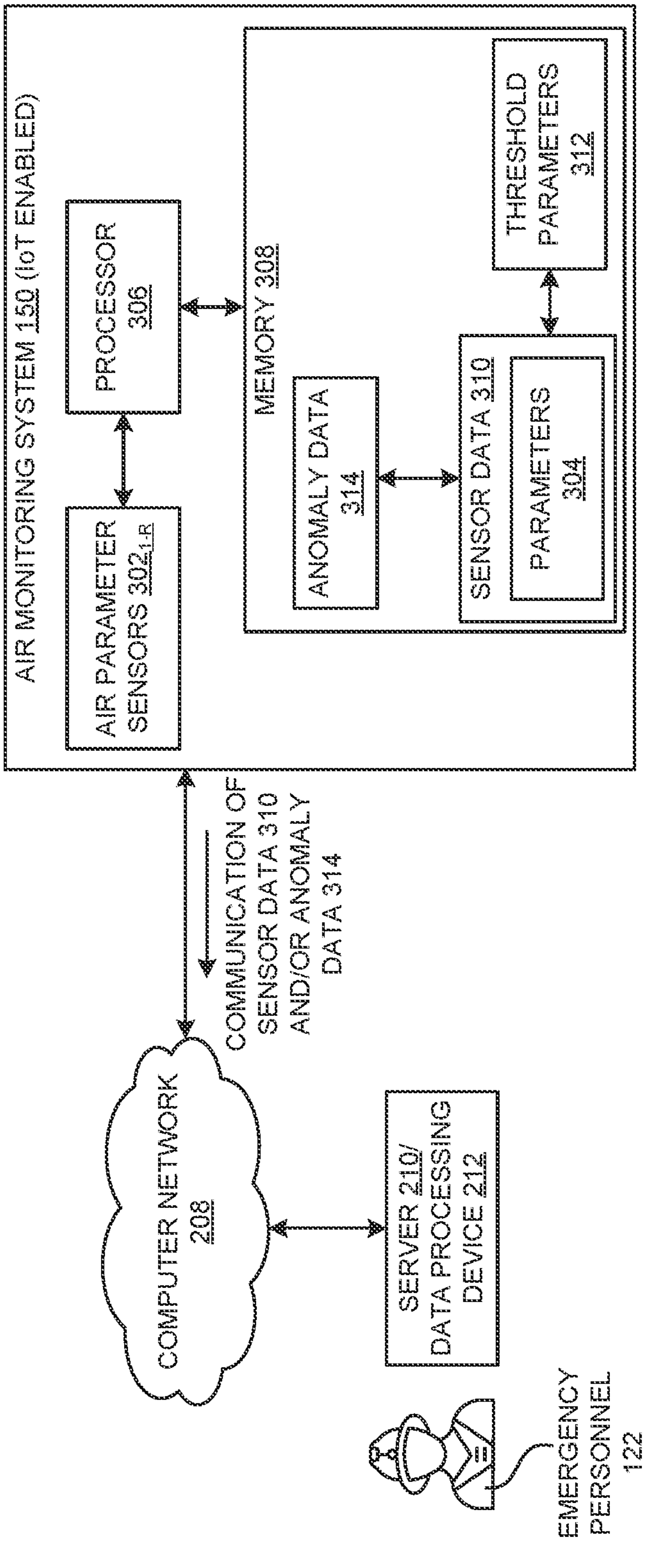
FIG. 3 is a schematic view of the air monitoring system of the safety system of FIGS. 1-2, according to one or more embodiments.

FIG. 3 shows air monitoring system 150, according to one or more embodiments. In one or more embodiments, air monitoring system 150 may include one or more air parameter sensors $302_{1-R}$ configured to sense parameters 304 associated with breathable air 103 such as pressure, temperature, oxygen content, carbon monoxide content, hydrocarbon content and moisture content; other parameters (e.g., air quality parameter(s), non-air quality parameter(s)) are within the scope of the exemplary embodiments discussed herein. In one or more embodiments, air monitoring system 150 may include a processor 306 (e.g., a microcontroller, a processor core, a single processor) communicatively coupled to a memory 308 (e.g., a volatile and/or a non-volatile memory); FIG. 3 shows air parameter sensors $302_{1-R}$ interfaced with processor 306. In one or more embodiments, data sensed by the aforementioned air parameter sensors $302_{1-R}$ may be part of sensor data 310 stored in memory 308; parameters 304 sensed may be part of sensor data 310.

Figure 4:
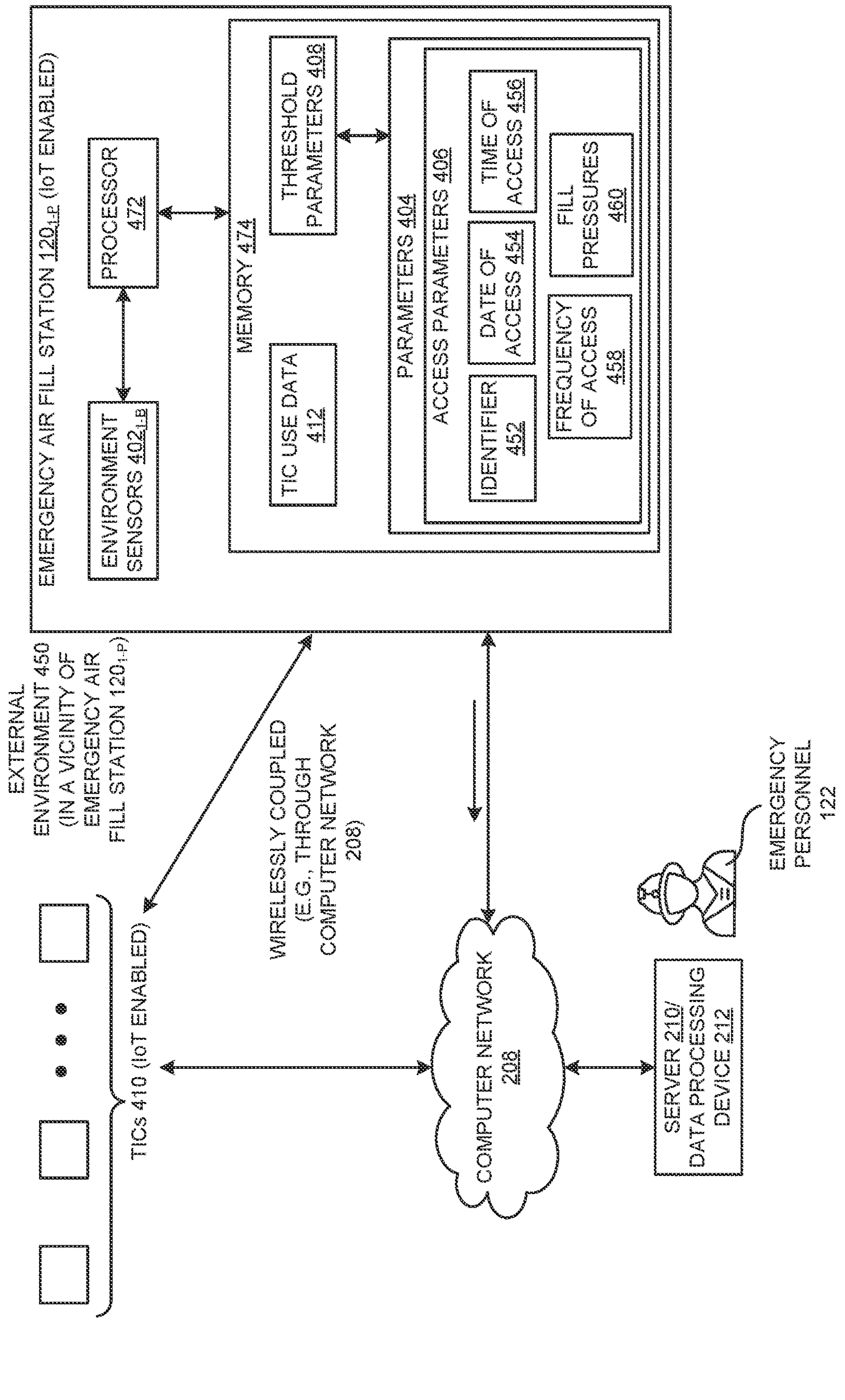
FIG. 4 is a schematic view of an emergency air fill station of the safety system of FIGS. 1-2, according to one or more embodiments.

In one or more embodiments, threshold values/ranges (e.g., threshold parameters 312) for parameters 304 sensed may also be stored in memory 308. In one or more embodiments, detecting through processor 306 in conjunction with one or more air parameter sensors $302_{1-R}$ that one or more parameters 304 is outside (e.g., below, above, outside) threshold parameters 312 may cause communication of anomalies (e.g., detected anomaly data 314 stored in memory 308) to server 210 through computer network 208 in accordance with the IoT capabilities discussed above. FIG. 4 shows an emergency air fill station $120_{1-P}$, according to one or more embodiments. Again, in one or more embodiments, emergency air fill station $120_{1-P}$ may include one or more environment sensors $402_{1-B}$ integrated therewith configured to sense parameters 404 (e.g., temperature, ambient light) of an environment (e.g., external environment 450) in an immediate vicinity of emergency air fill station $\mathbf{120}_{1\text{-}P}$. In one or more embodiments, environment sensors $\mathbf{402}_{1\text{-}B}$ may also sense access (e.g., access parameters 406 that are part of parameters 404 in FIG. 4) of emergency air fill station $\mathbf{120}_{1\text{-}P}$ by emergency personnel 122 (e.g., maintenance personnel, firefighters, emergency responders). Example access parameters 406 may include but are not limited to identifier 452 of emergency personnel 122, date of access 454 mapped to identifier 452, time of access 456 mapped to identifier 452, a frequency of access 458 and fill pressures 460 (e.g., pressures to which breathable air 103 is filled in air bottles/cylinders discussed above) mapped to identifier 452, time of access 456 and/or date of access 454. Obviously, time of access 456 may render a duration of access (not shown) mapped to identifier 452 also possible as an example access parameter 406.

In one or more embodiments, again based on sensed parameters 404 being outside (e.g., more than, less than, outside a range) threshold values/ranges (e.g., threshold parameters 408) based on the IoT capabilities discussed herein, anomalies in parameters 404 may be detected and collected at emergency air fill station $\mathbf{120}_{1\text{-}P}$ and transmitted to server 210 through computer network 208. In one or more embodiments, as shown in FIG. 4, emergency air fill station $\mathbf{120}_{1\text{-}P}$ may include a processor 472 (e.g., a microcontroller, a processor core, a single processor) communicatively coupled to a memory 474 (e.g., a volatile and/or a non-volatile memory). In one or more embodiments, environment sensors $\mathbf{402}_{1\text{-}B}$ may be interfaced with processor 472 and all of the abovementioned data/parameters may be stored in memory 474, as shown in FIG. 4.

FIG. 4 also shows TICs 410 as part of safety system 100 and in external environment 450 of emergency air fill station $\mathbf{120}_{1\text{-}P}$, according to one or more embodiments. In one or more embodiments, TICs 410 may be infrared cameras that sense infrared energy of objects to render images/video frames thereof corresponding to surface temperatures of said objects. In one or more embodiments, emergency personnel 122 may employ said TICs 410 to detect obstacles on the paths to/around emergency air fill stations $\mathbf{120}_{1\text{-}P}$ under low visibility; this may enable emergency personnel 122 perform rescue operations efficiently. As discussed and implied above, TICs 410 may be integrated with IoT capabilities to transmit data to server 210 through computer network 208. Said data may be part of access parameters 406 or separate data (e.g., TIC use data 412) transmitted to server 210.

It should be noted that the sensing, detection and/or transmission of data to server 210 discussed above with regard to emergency air fill station $\mathbf{120}_{1\text{-}P}$ may also be performed at a device external to emergency air fill station $\mathbf{120}_{1\text{-}P}$. In such implementations, the external device itself may obviously be a component of safety system 100 with IoT/wireless communication capabilities. All reasonable variations are within the scope of the exemplary embodiments discussed herein.

Figure 5:
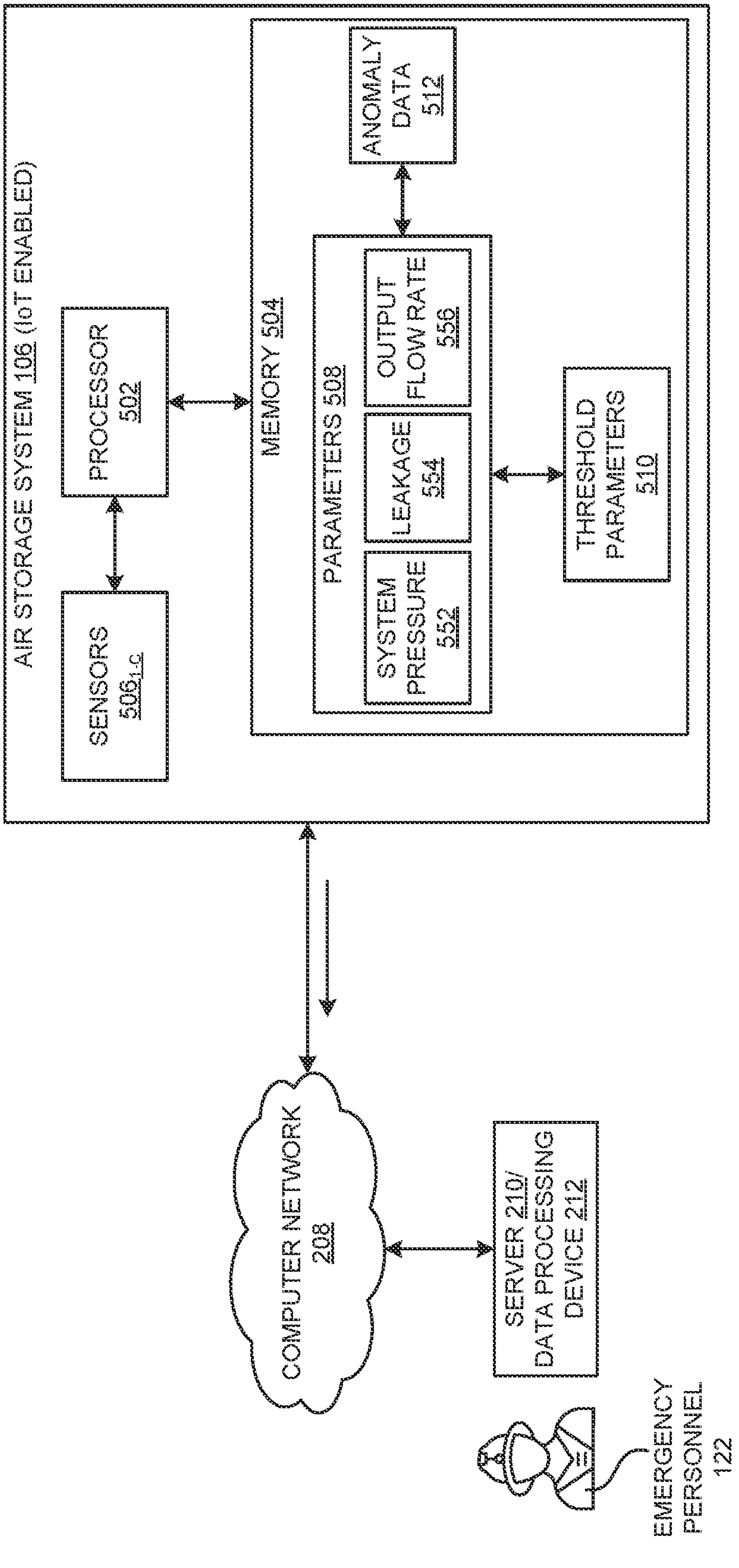
FIG. 5 is a schematic view of an air storage system of the safety system of FIGS. 1-2, according to one or more embodiments.

FIG. 5 shows air storage system 106, according to one or more embodiments. Again, as discussed above, in one or more embodiments, air storage system 106 may have IoT/wireless communication capabilities embedded therein or in a device external thereto that is communicatively coupled to air storage system 106. In one or more embodiments, air storage system 106 may include a processor 502 (e.g., a microcontroller, a processor core, a single processor) communicatively coupled to a memory 504 (e.g., a volatile and/or a non-volatile memory). Again, in one or more embodiments, air storage system 106 may include one or more sensors $\mathbf{506}_{1\text{-}C}$ configured to sense parameters (e.g., parameters 508 stored in memory 504) associated with air storage system 106; sensors $\mathbf{506}_{1\text{-}C}$ are shown interfaced with processor 502 Example parameters 508 sensed may include but are not limited to system pressure 552 (e.g., pressure at which breathable air 103 is output from air storage system 106), leakage 554 (e.g., leakage of breathable air 103 from air storage tanks $\mathbf{108}_{1\text{-}N}$) and output flow rate 556 (e.g., rate of flow of breathable air 103 out of air storage system 106). In one or more embodiments, parameters 508 may be transmitted to server 210 through computer network 208 for processing and/or analysis thereat.

Again, in one or more embodiments, anomalies based on parameters 508 being outside thresholds/ranges (e.g., threshold parameters 510 stored in memory 504) may be detected through sensors $\mathbf{506}_{1\text{-}C}$ (e.g., flow rate sensors, pressure sensors). FIG. 5 shows anomaly data 512 relevant to the aforementioned detected anomalies also transmitted to server 210 through computer network 208, according to one or more embodiments.

It should be noted that FIGS. 3-5 merely relate to example components of safety system 100 with which sensors/IoT devices are integrated and that integration of sensors/IoT devices with any other component (e.g., backup power unit 204 to sense frequency and/or duration of use thereof, isolation and bypass control system 202 to sense a frequency of bypass/isolation of emergency air fill stations $\mathbf{120}_{1\text{-}N}$, turning on/off of isolation valves $\mathbf{160}_{1\text{-}P}$ and so on) thereof conceivable is within the scope of the exemplary embodiments discussed herein. Referring back to FIG. 4, identifier 452 within access parameters 406 relevant to access of emergency air fill station $\mathbf{120}_{1\text{-}P}$ may also encompass a key fob based identification, a Radio Frequency Identification (RFID) based access, a Non-Fungible Token (NFT) based access, keys and/or access through an application component (e.g., component 706 to be discussed below) executing on data processing device 212. All reasonable variations are within the scope of the exemplary embodiments discussed herein.

Figure 6:
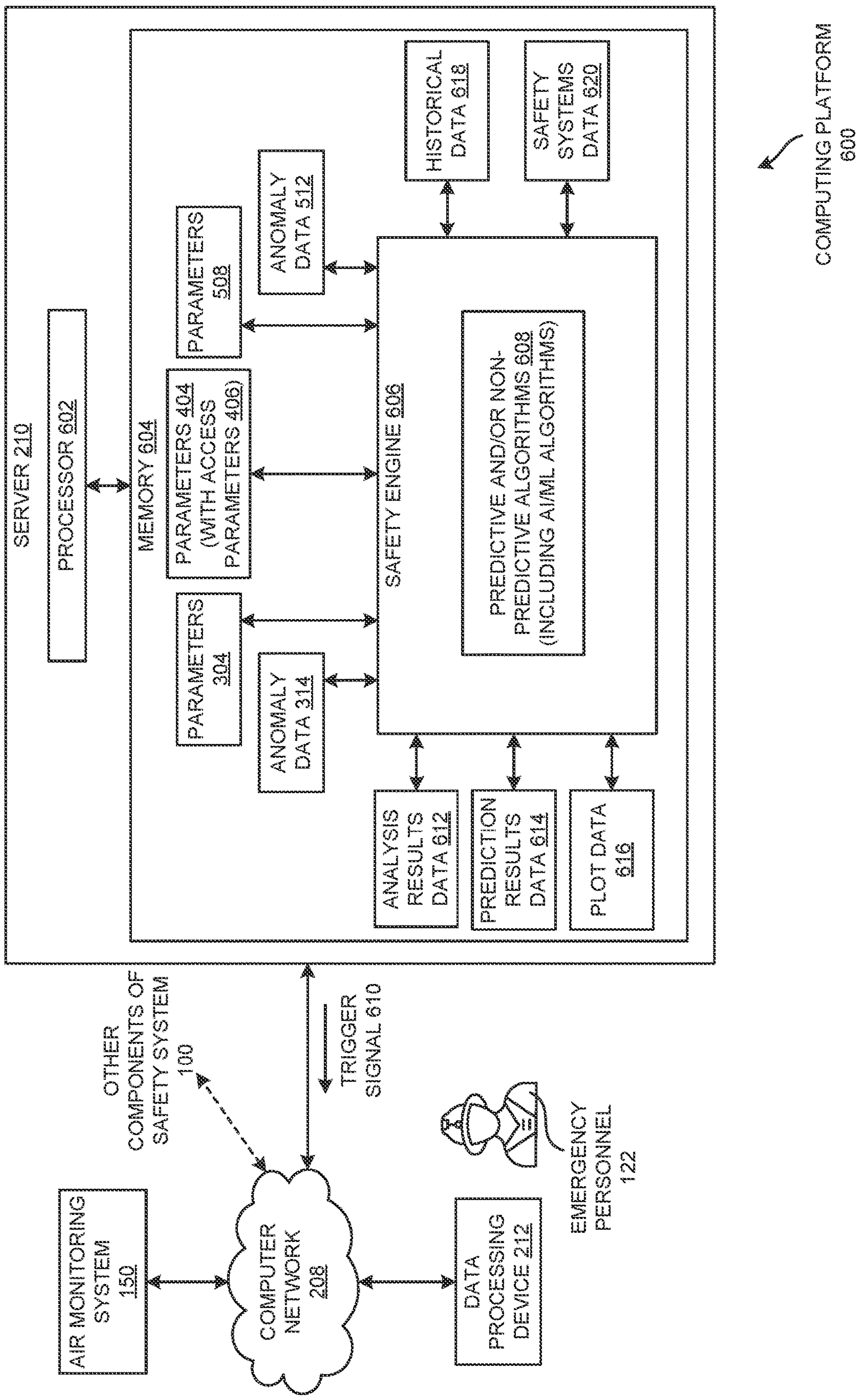
FIG. 6 is a schematic view of a computing platform relevant to the safety system of FIGS. 1-2 implemented through a server, according to one or more embodiments.

FIG. 6 shows a computing platform 600 relevant to the FARS of safety system 100 implemented through server 210, according to one or more embodiments. In one or more embodiments, server 210 may be a distributed (e.g., across a cloud) network of servers, a cluster of servers or a standalone server. As shown in FIG. 6, server 210 may include a processor 602 (e.g., a processor core, a network of processors, a single processor), communicatively coupled to a memory 604 (e.g., a volatile and/or a non-volatile memory). In one or more embodiments, memory 604 may include a safety engine 606 associated with the FARS stored therein and executable through processor 602. FIG. 6 shows memory 604 as including data (e.g., detected, sensed, anomalies) from one or more components of safety system 100; the limited amount of data shown must not be considered as limiting the scope of the exemplary embodiments discussed herein. In one or more embodiments, safety engine 606 may have one or more predictive and/or non-predictive algorithms (e.g., predictive and/or non-predictive algorithms 608) including Artificial Intelligence (AI)/Machine Learning (ML) based algorithms stored therein.

In one or more embodiments, execution of predictive and/or non-predictive algorithms 608 through processor 602 may involve taking the abovementioned data and profiling the FARS implemented as safety system 100. It should be noted that each of the aforementioned data (e.g., parameters 304, parameters 404, access parameters 406, parameters 508, anomaly data 314, anomaly data 512) may be real-time data from elements of safety system 100. In one or more embodiments, analysis of the data may result in beneficial decision making with regard to maintenance of safety system 100, safety of safety system 100 and/or efficiency thereof. For example, anomalies discussed above may be analyzed based on date, time and/or frequency thereof to predict that a specific duration of time in a winter season is associated with diminished characteristics of a component of safety system 100. All possible analyses are within the scope of the exemplary embodiments discussed herein.

In one or more embodiments, server 210 may also be utilized to remotely test and/or trigger operations of one or more components of safety system 100. FIG. 6 shows a trigger signal 610 communicated to air monitoring system 150 to get data thereof discussed above from processor 306, according to one or more embodiments. In some implementations, the components of safety system 100 may automatically transmit data thereof to server 210 and in some others, server 210 may transmit trigger signals (e.g., trigger signal 610) therefor. FIG. 6 also shows results of analysis/prediction through safety engine 606 as analysis results data 612, prediction results data 614 and plot data 616 (e.g., related to graphically plotting the results of analyses). Further, FIG. 6 shows data processing device 212 communicatively coupled to server 210 through computer network 208 as part of computing platform 600, according to one or more embodiments.

Figure 7:
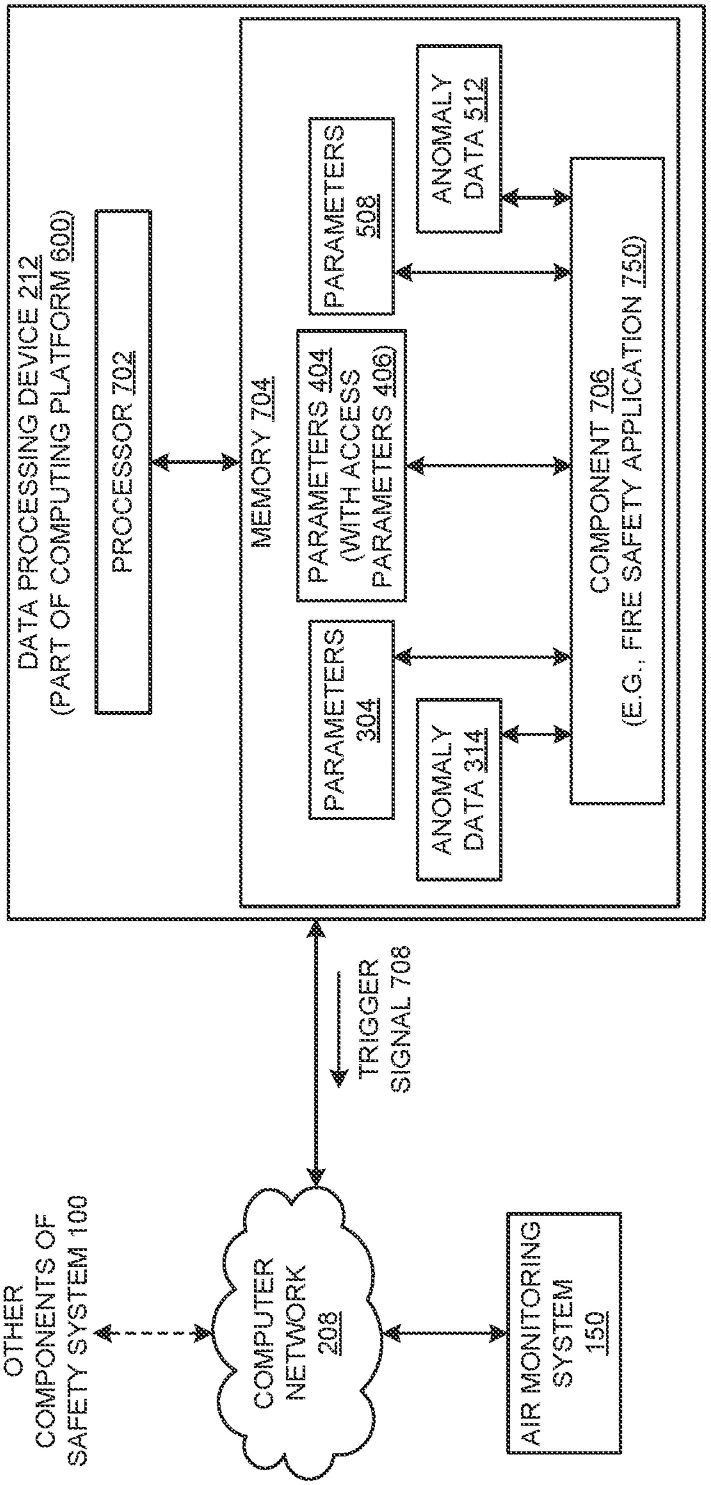
FIG. 7 is a schematic view of a data processing device of FIGS. 2-6, according to one or more embodiments.

FIG. 7 shows data processing device 212 (e.g., a mobile phone, a tablet, a smart device, a laptop) in detail, according to one or more embodiments. In one or more embodiments, again, data processing device 212 may include a processor 702 (e.g., a single processor, a processor core) communicatively coupled to a memory 704 (e.g., a volatile and/or a non-volatile memory). In one or more embodiments, memory 704 may include a component 706 of safety engine 606 stored therein and enabled/provided through processor 602 of server 210. FIG. 7 shows component 706 as a fire safety application 750 merely for example purposes. Again, in one or more embodiments, access to the data of one or more components of safety system 100 may be available to data processing device 212 via component 706 (e.g., through computer network 208 via safety engine 606 of server 210). FIG. 7 also shows capabilities to control components of safety system 100 through data processing device 212 via trigger signals; FIG. 7 specifically shows a trigger signal 708 to initiate collection of data from air monitoring system 150 merely for example purposes. Again, in some implementations, data may be automatically communicated to data processing device 212 and in some others, data processing device 212 may trigger (e.g., through trigger signal 708) collection thereof.

In one or more embodiments, access of emergency air fill station $\mathbf{120}_{1\text{-}P}$ through component 706 may cause collection of identifier 452 discussed above as part of access parameters 406. Thus, exemplary embodiments discussed herein provide for an integrated FARS computing platform (e.g., computing platform 600) that enables collection and/or analysis of real-time data from one or more components of safety system 100 and/or control (e.g., remotely) thereof. Further, the integrated FARS computing platform may provide for profiling of safety system 100 and/or emergency personnel 122 and/or remote management of requirements associated with safety system 100. For example, the profiling may involve utilizing (e.g., through safety engine 606) historical data (e.g., historical data 618 stored in memory 604 of server 210) from one or more components of safety system 100 and/or generic safety systems data (e.g., safety systems data 620 stored in memory 604 of server 210) from one or more safety systems other than safety system 100 to arrive at parts of analysis results data 612, prediction results data 614 and/or plot data 616. Again, as discussed above, in one or more embodiments, the integrated FARS computing platform may provide for quick decision making on the part of maintenance personnel, administrative personnel and/or emergency personnel (e.g., emergency personnel 122) associated with safety system 100; statistical analyses and/or data gathering and/or predictive and/or non-predictive analyses may also be enabled through the integrated FARS computing platform.

Also, in one or more embodiments, analogous analyses and/or prediction may also be performed at data processing device 212 based on enablement thereof through component 706. Further, it should be noted that detection of anomalies (e.g., anomaly data 314, anomaly data 512) may be performed through server 210 based on execution of safety engine 606 discussed above instead of or in addition to the detection thereof at the respective components. Further, as computing platform 600 may be enabled through the execution of safety engine 606, which, in turn, may enable component 706, both safety engine 606 and component 706 may be interpreted as computing platform 600 executing on server 210 and data processing device 212 respectively. All reasonable variations are within the scope of the exemplary embodiments discussed herein.

Figure 8:
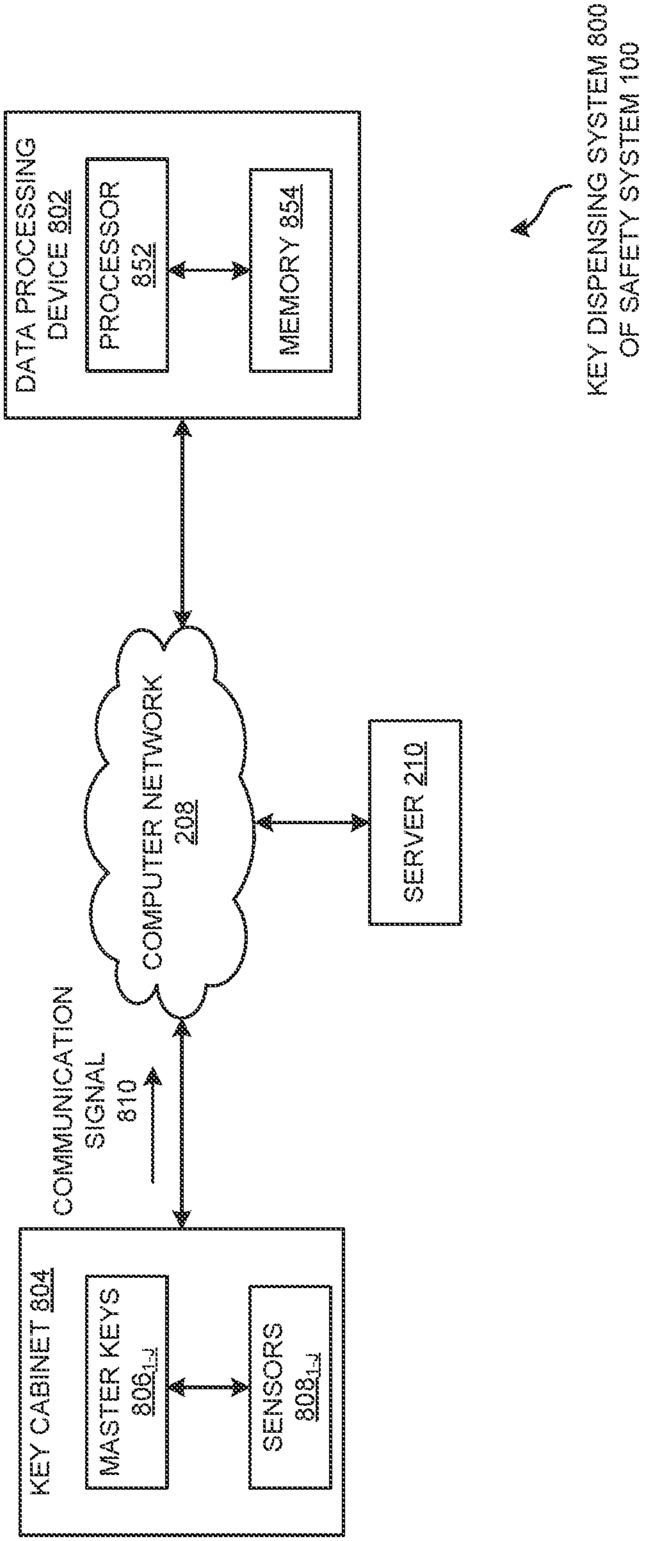
FIG. 8 is a schematic view of another data processing device implemented in the context of a master key dispensing system associated with the safety system of FIGS. 2-6, according to one or more embodiments.

FIG. 8 shows a data processing device 802 (e.g., a server, a desktop computer, a laptop, a mobile device, a tablet, a portable smart device) implemented in the context of a master key dispensing system 800 associated with safety system 100, according to one or more embodiments. In one or more embodiments, the functionalities of data processing device 802 described herein may be integrated with those of server 210 of FIGS. 2-6. Alternatively, in some embodiments, data processing device 802 may be distinct from server 210. FIG. 8 shows data processing device 802 as distinct from server 210 for example purposes. In one or more embodiments, data processing device 802 may be communicatively coupled to server 210 through computer network 208.

In one or more embodiments, master key dispensing system 800 may included a key cabinet 804 (a key storage device in general) including one or more master keys $\mathbf{806}_{1\text{-}J}$. In one or more embodiments, master keys $\mathbf{806}_{1\text{-}J}$ may be access keys (e.g., physical keys and/or smart keys) to provide access (e.g., by unlocking doors/cabinets/panels) to one or more of other components (e.g., air storage system 106, emergency air fill stations $\mathbf{120}_{1\text{-}P}$, air monitoring system 150, isolation and bypass control system 202) of safety system 100. In one or more embodiments, master keys $\mathbf{806}_{1\text{-}J}$ may be stored in key cabinet 804; a number of sensors $\mathbf{808}_{1\text{-}J}$ may be associated with master keys $\mathbf{806}_{1\text{-}J}$. While one sensor $\mathbf{808}_{1\text{-}J}$ may be associated with each master key $\mathbf{806}_{1\text{-}J}$, it should be noted that more than one sensor $\mathbf{808}_{1\text{-}J}$ being associated with one master key $\mathbf{806}_{1\text{-}J}$ or more than one master key $\mathbf{806}_{1\text{-}J}$ being associated with one sensor $\mathbf{808}_{1\text{-}J}$ is within the scope of the exemplary embodiments discussed herein.

For example, one or more sensors $\mathbf{808}_{1\text{-}J}$ may be a weight sensor that senses the presence of a master key $\mathbf{806}_{1\text{-}J}$ based on a weight thereof. If master key $\mathbf{806}_{1\text{-}J}$ is lifted off from a perch thereof, one or more sensors $\mathbf{808}_{1\text{-}J}$ corresponding thereto may sense a reduction in weight of a load thereon and, thereby, detect that master key $\mathbf{806}_{1\text{-}J}$ has been checked out. In another example, one or more sensors $\mathbf{808}_{1\text{-}J}$ may be a contact sensor that is part of an electrical circuit that is completed when master key $\mathbf{806}_{1\text{-}J}$ sits on the perch thereof. When master key $\mathbf{806}_{1\text{-}J}$ is lifted from the perch, the circuit is opened, which transmits a communication signal 810 to another processor (e.g., a local processor within key cabinet 804, a processor 852 of data processing device 802 communicatively coupled to a memory 854, as shown in FIG. 8) of key dispensing system 800. Other types of sensing through sensors $\mathbf{808}_{1\text{-}J}$ are within the scope of the exemplary embodiments discussed herein. Combinations of different types of sensors $\mathbf{808}_{1\text{-}J}$ are also within the scope of the exemplary embodiments discussed herein.

Figure 9:
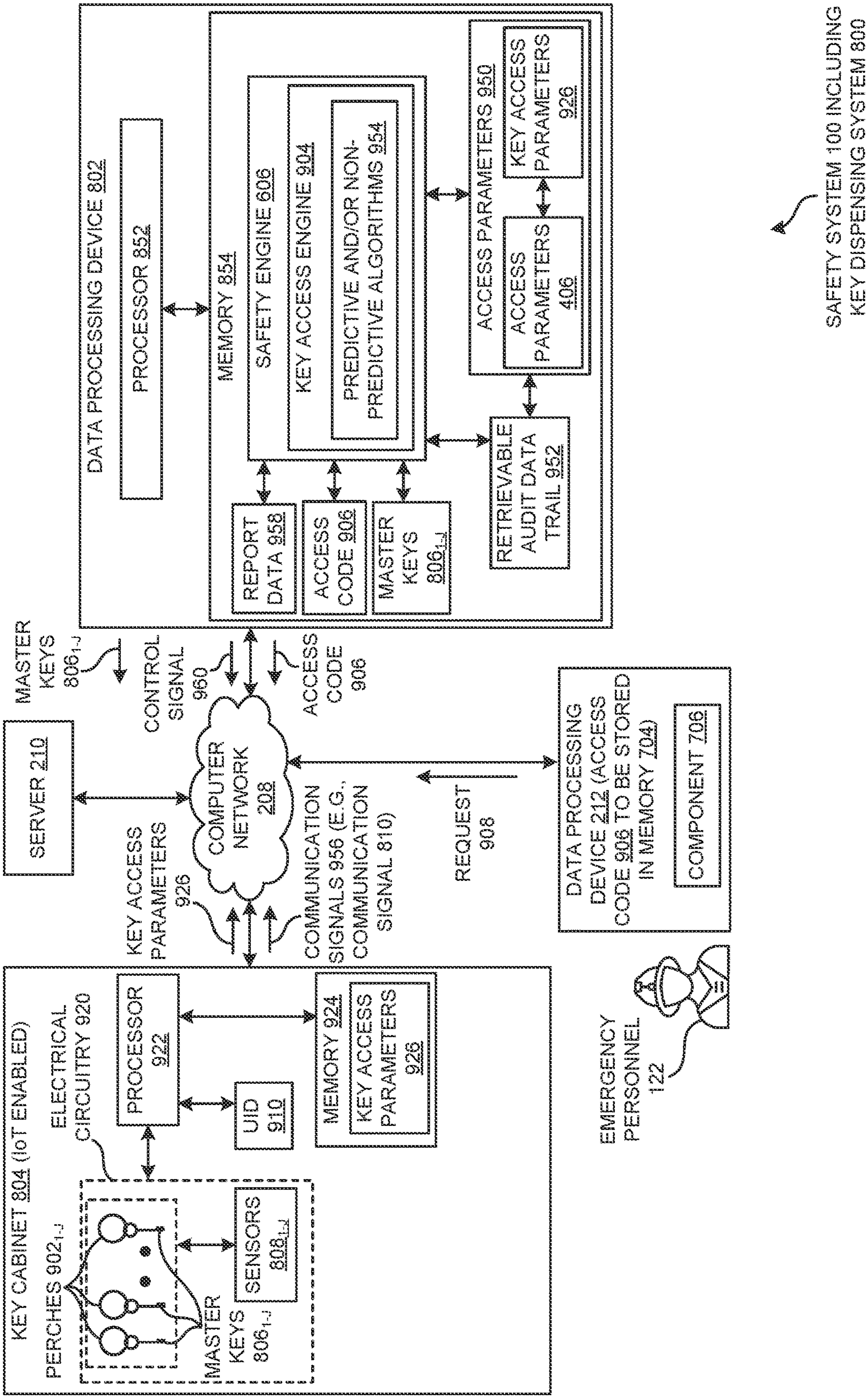
FIG. 9 is a schematic view of a key cabinet and the data processing device of the master key dispensing system context of FIG. 8 in more detail, according to one or more embodiments.

FIG. 8 shows key cabinet 804 as communicatively coupled to data processing device 802 (and server 210) through computer network 208, according to one or more embodiments. FIG. 9 shows key cabinet 804 and data processing device 802 in more detail, according to one or more embodiments. In one or more embodiments, key cabinet 804 may be an electromechanical device with electronic means of communication enabled therein. As seen in FIG. 8, key cabinet 804 may include master keys $\mathbf{806}_{1\text{-}J}$ held on corresponding perches $\mathbf{902}_{1\text{-}J}$ (e.g., hangers) thereof. Additionally, key cabinet 804 may include sensors $\mathbf{808}_{1\text{-}J}$ corresponding to master keys $\mathbf{806}_{1\text{-}J}$ and perches $\mathbf{902}_{1\text{-}J}$. In one or more embodiments, key cabinet 804 itself may thus be regarded as a component of safety system 100 analogous to air storage system 106, air monitoring system 150, emergency air fill stations $\mathbf{120}_{1\text{-}P}$ and isolation and bypass control system 202. In other embodiments, key cabinet 804 may be provided as part of or associated with other components of safety system 100 such as air storage system 106, air monitoring system 150, emergency air fill stations $\mathbf{120}_{1\text{-}P}$ and isolation and bypass control system 202.

In the case of data processing device 802 being the same as server 210 or distinct therefrom, memory 854 may include safety engine 606 or a component (e.g., key access engine 904 shown as part of safety engine 606) thereof. In one or more embodiments, in order to authorize emergency personnel 122 to access one or more components of safety system 100, data processing device 802 may generate an access code 906 based on execution of key access engine 904 thereon and transmit said access code 906 to data processing device 212 of emergency personnel 122 executing component 706. To facilitate this, in one or more embodiments, data processing device 802 (and, in some embodiments, even key cabinet 804) may be communicatively coupled to data processing device 212 through computer network 208. In some implementations, for the aforementioned purpose, data processing device 212 may transmit a request (e.g., request 908) to key access engine 904 for access to one or more components (e.g., key cabinet 804, air storage system 106, air monitoring system 150, emergency air fill stations $\mathbf{120}_{1\text{-}P}$, isolation and bypass control system 202, backup power unit 204) of safety system 100. In response to request 908, in one or more embodiments, access code 906 may be transmitted to data processing device 212 through key access engine 904. In some other implementations, access code 906 may be transmitted to data processing device 212 based on registration with data processing device 802.

It should be noted that data processing device 212 may have to execute component 706 in order for access code 906 to be sent thereto and in order for profiles of emergency personnel 122 to be tracked by key access engine 904. It should be noted that key access engine 904/safety engine 606/component 706 have to be integrated with sensors $\mathbf{808}_{1\text{-}J}$ to facilitate the master key access control discussed herein. Thus, key cabinet 804 itself may be IoT enabled/provided with IoT capabilities as discussed with regard to other components (e.g., air storage system 106, air monitoring system 150, emergency air fill stations $\mathbf{120}_{1\text{-}P}$, isolation and bypass control system 202) of safety system 100.

In the case of a physical implementation of master keys $\mathbf{806}_{1\text{-}J}$ discussed above, a master key $\mathbf{806}_{1\text{-}J}$ may be released to emergency personnel 122 only when emergency personnel 122 self-identifies with access code 906 entered through a user interface device (UID) 910 (e.g., a display unit) of key cabinet 804. In one or more embodiments, once emergency personnel 122 self-identifies using access code 906, data processing device 802 may automatically transmit a control signal 960 to release a master key $\mathbf{806}_{1\text{-}J}$ from a perch $\mathbf{902}_{1\text{-}J}$ thereof. In the case of a software master key implementation, in one or more embodiments, data processing device 802 may have software master keys $\mathbf{806}_{1\text{-}J}$ stored in memory 854; key access engine 904 itself may generate software master keys $\mathbf{806}_{1\text{-}J}$ (e.g., random alphanumeric and/or special characters valid for a session). In one or more embodiments, only when emergency personnel 122 self-identifies with access code 906 through component 706, a master key $\mathbf{806}_{1\text{-}J}$ (or one or more master keys $\mathbf{806}_{1\text{-}J}$) may be transmitted to data processing device 212 thereof. In one or more embodiments, emergency personnel 122 may enter master key $\mathbf{806}_{1\text{-}J}$ at one or more components (e.g., key cabinet 804, air storage system 106, emergency air fill stations $\mathbf{120}_{1\text{-}P}$, air monitoring system 150, isolation and bypass control system 202) of safety system 100 to gain access thereto. In some implementations, access code 906 (e.g., in the form of a Quick Response (QR) code) may be read by one or more components of safety system 100 based on wireless coupling/IoT capabilities thereof to enable access thereto.

All forms of access (e.g., based on physical master keys $\mathbf{806}_{1\text{-}J}$, based on software master keys $\mathbf{806}_{1\text{-}J}$, access code 906 based) control and management of one or more components (e.g., key cabinet 804, air storage system 106, emergency air fill stations $\mathbf{120}_{1\text{-}P}$, air monitoring system 150, isolation and bypass control system 202) of safety system 100 are within the scope of the exemplary embodiments discussed herein. Again, as seen above, parameters of access of the aforementioned one or more components of safety system 100 analogous to and including access parameters 406 may be captured through key access engine 904. Alternatively, in one or more embodiments, key cabinet 804 itself may include electrical circuitry 920 including sensors $\mathbf{808}_{1\text{-}J}$ and a processor 922 communicatively coupled to a memory 924 thereto; sensors $\mathbf{808}_{1\text{-}J}$ may be interfaced with processor 922.

In one or more embodiments, memory 924 may locally store key access parameters 926 relevant to access of physical master keys $\mathbf{806}_{1\text{-}J}$; said key access parameters 926 may be transmitted to data processing device 802 for further analysis thereat. FIG. 9 shows access parameters 950 of one or more components of safety system 100 including access parameters 406 and key access parameters 926 stored therein, according to one or more embodiments. In implementations of data processing device 802 analogous to server 210, in one or more embodiments, key access engine 904 may track access of one or more components of safety system 100 such that access parameters 950 are associated with a retrievable audit data trail 952 (e.g., stored in a database (not shown) of memory 854) stored in memory 854. In one or more embodiments, authorized personnel may access retrievable audit data trail 952 and glean access information therefrom.

In one or more embodiments, key access engine 904 may execute predictive and/or non-predictive algorithms 954

(analogous to predictive and/or non-predictive algorithms 608) to provide results of analysis of key access parameters 926 and/or plots. In one or more embodiments, any attempt (e.g., authorized, unauthorized) to access key cabinet 804 and/or master keys $\mathbf{806}_{1\text{-}J}$ may cause one or more sensors $\mathbf{808}_{1\text{-}J}$ to transmit communication signals 956 (e.g., including communication signal 810) to data processing device 802 that causes key access engine 904 to interpret said communication signals 956 for predictive and/or non-predictive analyses using predictive and/or non-predictive algorithms 954. Whenever possible, identifiers (e.g., identifier 452) of emergency personnel 122 attempting the aforementioned access may be gleaned from communication signals 956, according to one or more embodiments. The gleaned information may also form part of retrievable audit data trail 952. It should be noted that attempts at accessing other components (e.g., air storage system 106, emergency air fill stations $\mathbf{120}_{1\text{-}P}$, air monitoring system 150, isolation and bypass control system 202) may also be captured by safety engine 606/component 706 of server 210/data processing device 212 based on communication signals analogous to communication signals 956.

In one or more embodiments, retrievable audit data trail 952 may be utilized by key access engine 904 (or safety engine 606) to generate reports (e.g., report data 958) that aid maintenance, safety, security, efficiency and/or improvement related operations/initiatives relevant to safety system 100. Also, as seen above, identification (e.g., based on identifier 452) of emergency personnel 122/data processing device 212 thereof at the one or more components (e.g., key cabinet 804, emergency air fill stations $\mathbf{120}_{1\text{-}P}$, air storage system 106, air monitoring system 150, isolation and bypass control system 202) of safety system 100 may also encompass but are not limited to a key fob based identification, an RFID based access, an NFT based access, keys (e.g., master keys 80614, access code 906) and/or access through an application component (e.g., component 706) executing on data processing device 212. Also, master keys $\mathbf{806}_{1\text{-}J}$ themselves may not be limited to the access keys (physical, smart and/or software access keys) discussed above. Although some may be already mentioned, in one or more embodiments, master keys $\mathbf{806}_{1\text{-}J}$ may also be digital key fobs, RFID based access keys, digital access keys, key cards, proximity keys, QR codes, barcodes, NFT based access keys and/or biometric identification based access keys.

All pertinent discussions applicable to computing platform 600, which is also interpretable as safety engine 606 and/or component 706, are also applicable to key access engine 904. Thus, key access engine 904 may also be interpreted as a computing platform and/or a component thereof analogous to safety engine 606 and/or component 706 respectively. Further, additional implementations such as unauthorized access or unauthorized attempts to access (e.g., wrong access code 906 entered multiple number of times, tampering with key cabinet 804 and/or other components of safety system 100) components of safety system 100 including key cabinet 804 and/or master keys $\mathbf{806}_{1\text{-}J}$ being detected by key access engine 904 and appropriate control signals (e.g., analogous to control signal 960) transmitted therethrough to activate an alarm device (e.g., visual and/or audio alarm device) and/or notifications transmitted therethrough to appropriate data processing devices (e.g., mobile devices and/or servers associated with emergency personnel 122) are within the scope of the exemplary embodiments discussed herein. All reasonable variations are also within the scope of the exemplary embodiments discussed herein.

Figure 10:
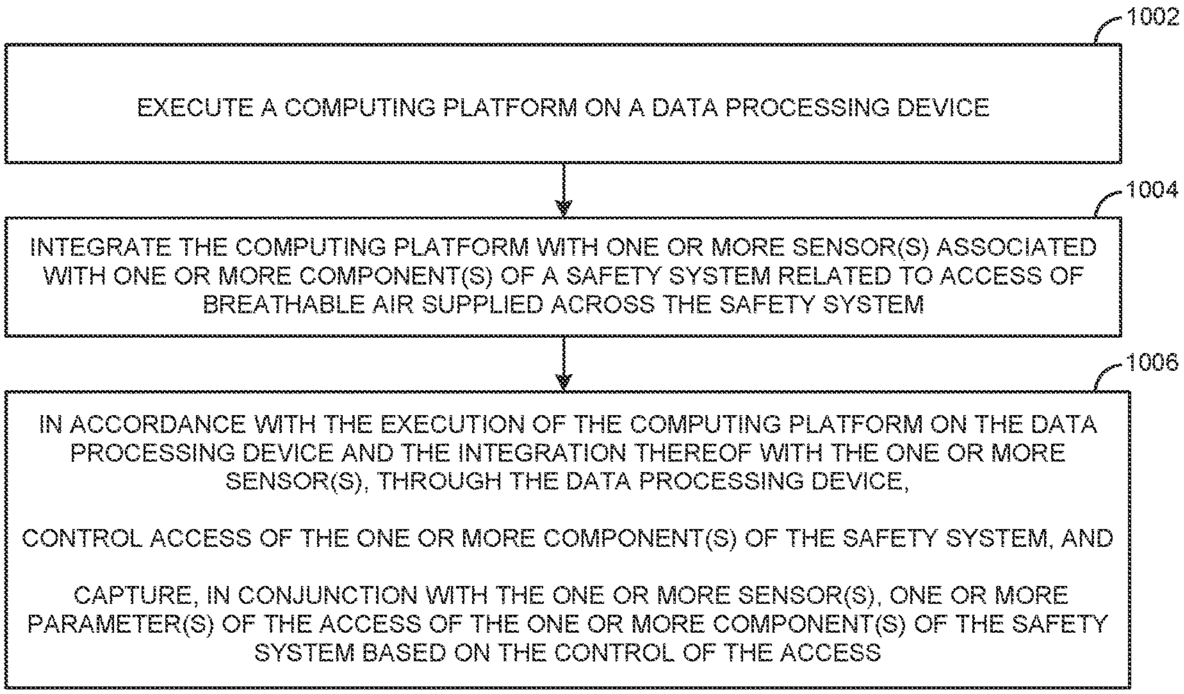
FIG. 10 is a process flow diagram detailing the operations involved in access control and management of components of a safety system of a structure having breathable air supplied thereacross, according to one or more embodiments.

FIG. 10 shows a process flow diagram detailing the operations involved in access control and management of components (e.g., air storage system 106, emergency air fill stations $\mathbf{120}_{1\text{-}P}$, air monitoring system 150, key cabinet 804, isolation and bypass control system 202, backup power unit 204) of a safety system (e.g., safety system 100) of a structure (e.g., structure 102) having breathable air (e.g., breathable air 103) supplied thereacross, according to one or more embodiments. In one or more embodiments, operation 1002 may involve executing a computing platform (e.g., safety engine 606, component 706, key access engine 904) on a data processing device (e.g., server 210, data processing device 212, data processing device 802). In one or more embodiments, operation 1004 may involve integrating the computing platform with one or more sensor(s) (e.g., sensors $\mathbf{808}_{1\text{-}J}$, environment sensors $\mathbf{402}_{1\text{-}B}$) associated with one or more component(s) of the safety system related to access of the breathable air supplied across the safety system.

In one or more embodiments, operation 1006 may then involve, in accordance with the execution of the computing platform on the data processing device and the integration thereof with the one or more sensor(s), through the data processing device, controlling access of the one or more component(s) of the safety system, and capturing, in conjunction with the one or more sensor(s), one or more parameter(s) (e.g., access parameters 950) of the access of the one or more component(s) of the safety system based on the control of the access.

Although the present embodiments have been described with reference to specific example embodiments, it will be evident that various modifications and changes may be made to these embodiments without departing from the broader spirit and scope of the various embodiments.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A method of a safety system of a structure having breathable air supplied thereacross via a fixed piping system implemented therein, comprising:

executing a computing platform on a data processing device;

integrating the computing platform with at least one sensor associated with at least one component of the safety system related to access of the breathable air supplied across the safety system; and in accordance with the execution of the computing platform on the data processing device and the integration thereof with the at least one sensor, through the data processing device, controlling access of the at least one component of the safety system, and capturing, in conjunction with the at least one sensor, at least one parameter of the access of the at least one component of the safety system based on the control of the access.

2. The method of claim 1, comprising the at least one component of the safety system being at least one of: an air storage system serving as a source of the breathable air, an air monitoring system monitoring the breathable air across the safety system, an emergency air fill station providing the access to the breathable air, an isolation and bypass control system serving to at least one of: isolate and include the emergency air fill station with respect to the access of the breathable air, a backup power unit and a key cabinet comprising a plurality of keys providing the access to the at least one component.

3. The method of claim 1, wherein controlling the access of the at least one component further comprises at least one of:

detecting an interaction with an access key of a key cabinet serving as at least a part of the at least one component in conjunction with the at least one sensor;

transmitting at least one of: an access code and a master key to another data processing device in response to a request for the access of the at least one component from the another data processing device; and authorizing a user associated with the another data processing device to access the at least one component based on reading the transmitted at least one of: the access code and the master key.

4. The method of claim 1, further comprising leveraging, through the data processing device, the captured at least one parameter as a retrievable audit data trail related to the access of the at least one component of the safety system.

5. The method of claim 1, comprising the captured at least one parameter being at least one of: an identifier of a user associated with the access of the at least one component, a time of the access of the at least one component mapped to the identifier, a date of the access of the at least one component mapped to the identifier, a frequency of the access of the at least one component mapped to the identifier and a duration of the access of the at least one component mapped to the identifier.

6. The method of claim 1, comprising controlling the access of the at least one component based on identifying a user associated with the access of the at least one component in accordance with at least one of: a key fob based identification, a Radio Frequency Identification (RFID) based access, a Non-Fungible Token (NFT) based access, a physical key based access, a code based access and access through a component of the computing platform executing on another data processing device of the user.

7. The method of claim 1, further comprising the at least one component of the safety system being Internet of Things (IoT) enabled.

8. A data processing device of a safety system of a structure having breathable air supplied thereacross via a fixed piping system implemented therein, comprising:

a memory comprising instructions associated with a computing platform stored therein; and a processor communicatively coupled to the memory, the processor executing the instructions associated with the computing platform to:

integrate the computing platform with at least one sensor associated with at least one component of the safety system related to access of the breathable air supplied across the safety system, and in accordance with the integration of the computing platform with the at least one sensor, control access of the at least one component of the safety system, and capture, in conjunction with the at least one sensor, at least one parameter of the access of the at least one component of the safety system based on the control of the access.

9. The data processing device of claim 8, wherein the processor executes the instructions associated with the computing platform to control the access of the at least one component based on at least one of:

detecting an interaction with an access key of a key cabinet serving as at least a part of the at least one component in conjunction with the at least one sensor, transmitting at least one of: an access code and a master key to another data processing device in response to a request for the access of the at least one component from the another data processing device, and authorizing a user associated with the another data processing device to access the at least one component based on reading the transmitted at least one of: the access code and the master key.

10. The data processing device of claim 8, wherein the processor further executes the instructions associated with the computing platform to leverage the captured at least one parameter as a retrievable audit data trail related to the access of the at least one component of the safety system.

11. The data processing device of claim 8, wherein the processor executes the instructions associated with the computing platform to capture at least one of: an identifier of a user associated with the access of the at least one component, a time of the access of the at least one component mapped to the identifier, a date of the access of the at least one component mapped to the identifier, a frequency of the access of the at least one component mapped to the identifier and a duration of the access of the at least one component mapped to the identifier as the at least one parameter.

12. The data processing device of claim 8, wherein the processor executes the instructions associated with the computing platform to control the access of the at least one component based on identifying a user associated with the access of the at least one component in accordance with at least one of: a key fob based identification, an RFID based access, an NFT based access, a physical key based access, a code based access and access through a component of the computing platform executing on another data processing device of the user.

13. The data processing device of claim 8, wherein the processor executes instructions associated with the computing platform to control the access to at least one of: an air storage system serving as a source of the breathable air, an air monitoring system monitoring the breathable air across the safety system, an emergency air fill station providing the access to the breathable air, an isolation and bypass control system serving to at least one of: isolate and include the emergency air fill station with respect to the access of the breathable air, a backup power unit and a key cabinet comprising a plurality of keys providing the access to the at least one component as the at least one component of the safety system.

14. A safety system of a structure having breathable air supplied thereacross via a fixed piping system implemented therein, comprising:

at least one component related to access of the breathable air supplied across the safety system;

at least one sensor associated with the at least one component; and a data processing device executing instructions associated with a computing platform to:

integrate the computing platform with the at least one sensor, and in accordance with the integration of the computing platform with the at least one sensor, control access of the at least one component, and capture, in conjunction with the at least one sensor, at least one parameter of the access of the at least one component based on the control of the access.

15. The safety system of claim 14, wherein the data processing device executes the instructions associated with the computing platform to control the access of the at least one component based on at least one of:

detecting an interaction with an access key of a key cabinet serving as at least a part of the at least one component in conjunction with the at least one sensor, transmitting at least one of: an access code and a master key to another data processing device in response to a request for the access of the at least one component from the another data processing device, and authorizing a user associated with the another data processing device to access the at least one component based on reading the transmitted at least one of: the access code and the master key.

16. The safety system of claim 14, wherein the data processing device further executes the instructions associated with the computing platform to leverage the captured at least one parameter as a retrievable audit data trail related to the access of the at least one component.

17. The safety system of claim 14, wherein the data processing device executes the instructions associated with the computing platform to capture at least one of: an identifier of a user associated with the access of the at least one component, a time of the access of the at least one component mapped to the identifier, a date of the access of the at least one component mapped to the identifier, a frequency of the access of the at least one component mapped to the identifier and a duration of the access of the at least one component mapped to the identifier as the at least one parameter.

18. The safety system of claim 14, wherein the data processing device executes the instructions associated with the computing platform to control the access of the at least one component based on identifying a user associated with the access of the at least one component in accordance with at least one of: a key fob based identification, an RFID based access, an NFT based access, a physical key based access, a code based access and access through a component of the computing platform executing on another data processing device of the user.

19. The safety system of claim 14, wherein the data processing device executes instructions associated with the computing platform to control the access to at least one of: an air storage system serving as a source of the breathable air, an air monitoring system monitoring the breathable air across the safety system, an emergency air fill station providing the access to the breathable air, an isolation and bypass control system serving to at least one of: isolate and include the emergency air fill station with respect to the access of the breathable air, a backup power unit and a key cabinet comprising a plurality of keys providing the access to the at least one component as the at least one component of the safety system.

20. The safety system of claim 14, wherein the at least one component is IoT enabled.

* * * * *